(12) United States Patent
Richardson et al.

(10) Patent No.: US 11,767,109 B2
(45) Date of Patent: Sep. 26, 2023

(54) MODULAR UNMANNED AIR VEHICLES

(71) Applicant: BLUE BEAR SYSTEMS RESEARCH LIMITED, Oakley (GB)

(72) Inventors: Samuel Antony Richardson, Bedford (GB); Michael Alexander Snook, Bedford (GB); David Scott Weight, Chesham (GB)

(73) Assignee: BLUE BEAR SYSTEMS RESEARCH LIMITED, Oakley (GB)

( * ) Notice: Subject to any disclaimer, the term of this patent is extended or adjusted under 35 U.S.C. 154(b) by 644 days.

(21) Appl. No.: 16/630,772

(22) PCT Filed: Jul. 13, 2018

(86) PCT No.: PCT/GB2018/052006
§ 371 (c)(1),
(2) Date: Jan. 13, 2020

(87) PCT Pub. No.: WO2019/012297
PCT Pub. Date: Jan. 17, 2019

(65) Prior Publication Data
US 2020/0180760 A1    Jun. 11, 2020

(30) Foreign Application Priority Data
Jul. 13, 2017   (GB) .................................... 1711309

(51) Int. Cl.
*B64C 3/56*      (2006.01)
*B64U 30/10*     (2023.01)
(Continued)

(52) U.S. Cl.
CPC .............. *B64C 39/024* (2013.01); *B64C 3/56* (2013.01); *B64F 5/00* (2013.01); *B64C 2211/00* (2013.01);
(Continued)

(58) Field of Classification Search
CPC ....... B64C 3/56; B64C 2211/00; B64C 1/068; B64C 1/00; A63H 27/001
See application file for complete search history.

(56) References Cited

U.S. PATENT DOCUMENTS 3,729,862 A    5/1973   Halsey
5,334,068 A    8/1994   Davis
(Continued)

FOREIGN PATENT DOCUMENTS

CA       2815850 A1    11/2014
CN     203634824 U      6/2014
(Continued)

OTHER PUBLICATIONS

FliteTest, Tiny Trainer Build, Mar. 19, 2015, [https://www.youtube.com/watch?v=KJWg5HJBGGc&list=PL6luSFWz4kttcs02D4mJOsjFPy1NYHVuZ&index=25] (Year: 2015).*
(Continued)

*Primary Examiner* — Timothy D Collins
*Assistant Examiner* — Justin Michael Heston
(74) *Attorney, Agent, or Firm* — DLA Piper LLP (US)

(57) ABSTRACT

Embodiments relate to reconfigurable unmanned vehicles (100). Such vehicles (100) comprise a fuselage (102) presenting a bay (118) for receiving a plurality of components (120-128), each of the plurality of components (120-128) relating to a respective entity for at least one of flight control or operation of the unmanned vehicle (100). The bay (118) comprising a bus to support communications between at least two of the plurality of components (120-128), the plurality of components (120-128) comprising a controller to determine a configuration or presence of one or more than one component of the plurality of components (120-128) when coupled to the bus.

9 Claims, 31 Drawing Sheets

(51) Int. Cl.
  *B64U 80/00* (2023.01)
  *B64C 39/02* (2023.01)
  *B64F 5/00* (2017.01)
  *B64U 10/25* (2023.01)

(52) U.S. Cl.
  CPC .......... *B64D 2221/00* (2013.01); *B64U 10/25* (2023.01); *B64U 30/10* (2023.01); *B64U 80/00* (2023.01)

(56) References Cited

U.S. PATENT DOCUMENTS

| | | | |
|---|---|---|---|
| 6,056,237 | A | 5/2000 | Woodland |
| 6,665,594 | B1 | 12/2003 | Armstrong |
| 8,548,646 | B1 | 10/2013 | Gariepy et al. |
| 9,348,333 | B1 | 5/2016 | Buchmueller et al. |
| 2006/0091258 | A1 | 5/2006 | Chiu et al. |
| 2010/0282897 | A1* | 11/2010 | de la Torre ........... B64C 39/024 244/49 |
| 2012/0035787 | A1 | 2/2012 | Dunkelberger et al. |
| 2013/0245857 | A1 | 9/2013 | Gariepy et al. |
| 2014/0061380 | A1 | 3/2014 | Zhao |
| 2016/0253908 | A1 | 9/2016 | Chambers et al. |
| 2017/0036748 | A1 | 2/2017 | Plater |
| 2018/0086434 | A1* | 3/2018 | Cook ...................... B64C 31/02 |

FOREIGN PATENT DOCUMENTS

| | | | | |
|---|---|---|---|---|
| CN | 106628201 A | | 5/2017 | |
| GB | 2490141 A | * | 10/2012 | ........... B64C 39/024 |
| GB | 2490141 A | | 10/2012 | |
| GB | 2505942 A | * | 3/2014 | ............... B64C 3/40 |
| WO | 2011149544 A1 | | 12/2011 | |
| WO | 2014025617 A1 | | 2/2014 | |
| WO | 2016089882 A1 | | 6/2016 | |
| WO | 2018163159 A1 | | 9/2018 | |

OTHER PUBLICATIONS

Flite Test, Tiny Trainer Build, Mar. 19, 2015, [https://www.youtube.com/watch?v=KJWg5HJBGGc] (Year: 2015).*
Flite Test, FT 3D Scratch Build, Feb. 28, 2013, [https://www.youtube.com/watch?v=JBKC5i8MHlk] (Year: 2013).*
International Search Report for PCT Application No. PCT/GB2018/052006 dated Nov. 14, 2018.
Great Britain Search Report for GB1711309.3 dated Dec. 21, 2017.

* cited by examiner

| 508 | 514 Asset Table | 520 | 526 |
|---|---|---|---|
| Asset 1 | Present | Absent | API or S/W module |
| Asset 2 | Present | Absent | API or S/W module |
| ... 510 | ... 518 516 | ... 524 522 | ... 530 528 |
| Asset N | Present | Absent | API or S/W module |

502 → (Asset 1 row) 512
504 → (Asset 2 row)
506 → (Asset N row)

MODULAR UNMANNED AIR VEHICLES

This application is a 371 filing of PCT/GB2018/052006 filed Jul. 13, 2018, which claims priority to G.B. Serial No. 1711309.3 filed Jul. 13, 2017, each of which are hereby incorporated by reference.

BACKGROUND

Unmanned vehicles have found increasing use over recent years in both civilian and military capacities. For example, unmanned vehicles have been used for aerial visual inspection of otherwise inaccessible or difficult to access spaces. Typically, an unmanned vehicle comprises a means of propulsion, a means of communication and a controller that is responsive to commands from a ground station. For example, the Inspire 2 drone, available from DJI, is a camera bearing drone that can be used for visually inspecting otherwise difficult to reach places. It can be appreciated that the Inspire 2 drone pro can be used with different cameras, but there is otherwise little flexibility in its configuration.

A particular difficulty faced in limited or constrained environments such as, for example, on board a military or civilian vessel such as a ship, is storage space, which is at a premium. To have unmanned vehicles that are capable of multiple tasks, multiple unmanned vehicles tailored to each task would form part of a ship's inventory. It can be appreciated that having an inventory comprising multiple unmanned vehicles will have a corresponding storage space overhead. Still further, within such constrained environments, with limited resources and equipment, repairing damaged unmanned vehicles is just as challenging.

BRIEF DESCRIPTION OF THE DRAWINGS

Aspects, features and advantages of embodiments will become apparent from the following description given in reference to the appended drawings in which like numerals denote like elements and in which:

FIG. 5 shows an asset table according to embodiments;

DETAILED DESCRIPTION

Figure 1:
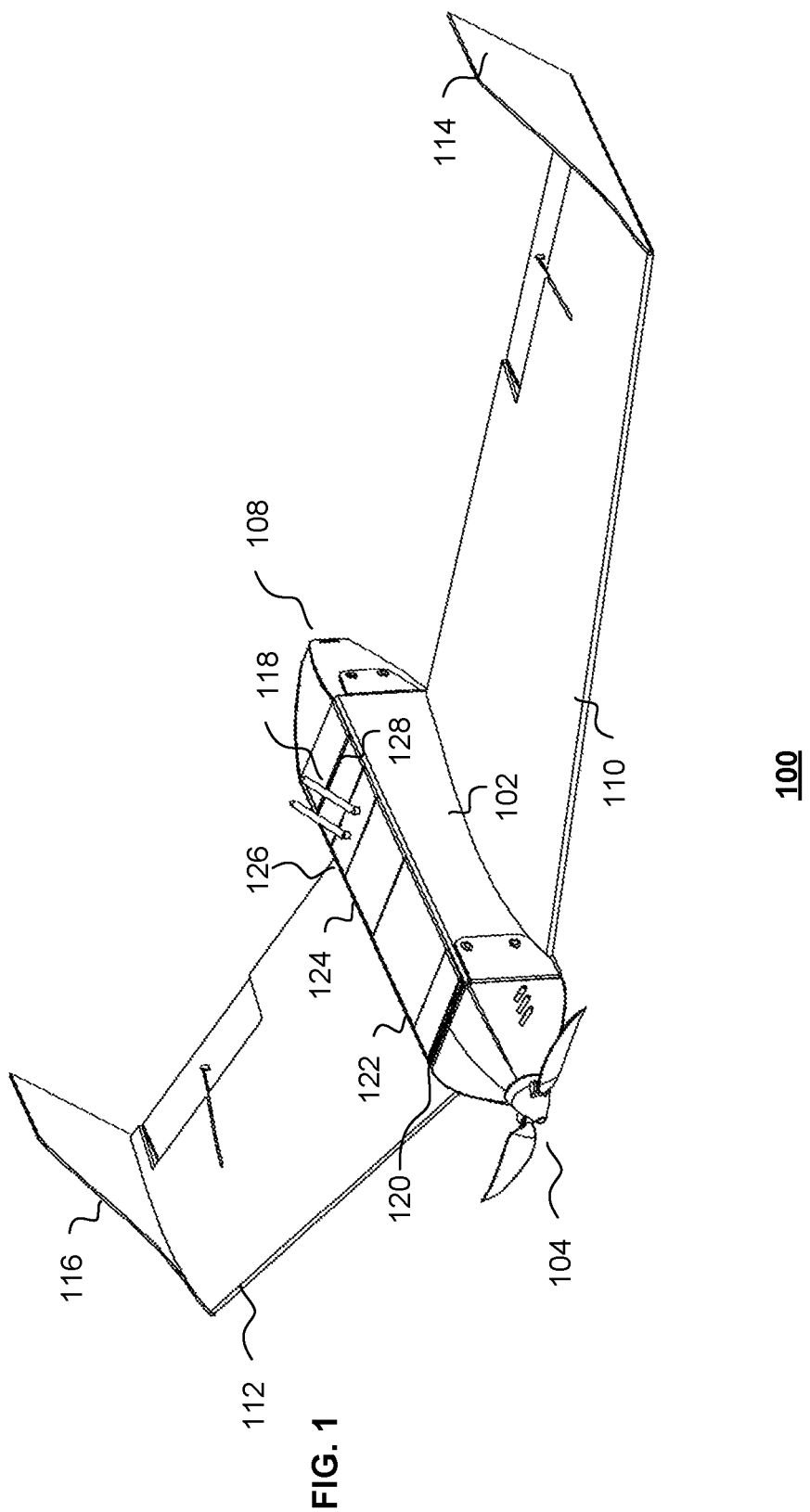
FIG. 1 illustrates an unmanned vehicle according to embodiments.

Referring to FIG. 1 there is shown an unmanned vehicle (UV) 100 according to embodiments. The UV 100 comprises a fuselage 102. The fuselage 102 can comprise a front portion 104. In the embodiment shown, the front portion can be a propulsion unit. The propulsion unit comprises a motor (not shown) that drives a propeller 106. The fuselage 102 can comprise a tail portion 108. The UV 100 additionally comprises a pair of wings 110 and 112. The wings 110 and 112 depicted comprise winglets 114 and 116. The fuselage comprises a bay 118. The bay 118 of the fuselage 102 is shown as having a set of installed components 120 to 128. The set of installed components 120 to 128 can be selected from a plurality of possible components for installation in the bay 118. The plurality of possible components for installation in the bay 118 can comprise, for example, one or more than one of a flight controller 132, a payload 134, a communications module 136, a propulsion module such as, for example, the propulsion module 104 depicted, a rotor module 138, a tail portion such as, for example, the tail portion 108 depicted, a mission module 140 and a battery component 142, taken jointly and severally in any and all permutations. It can be appreciated that the plurality of possible components for installation in the bay 118 is greater than the number of components that can be accommodated by the bay 118.

Figure 2:
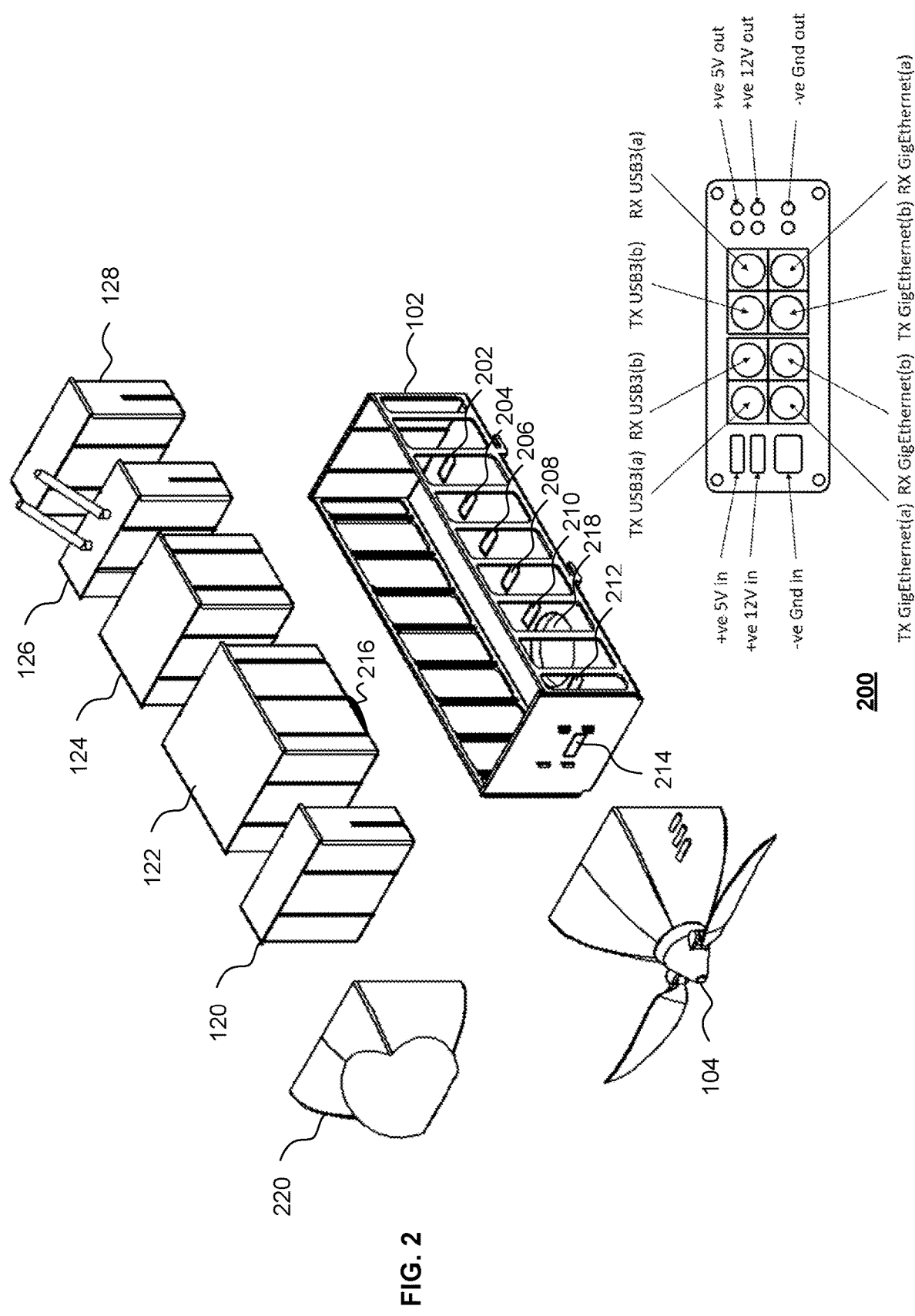
FIG. 2 shows an exploded view of the unmanned vehicle of FIG. 1.

FIG. 2 shows an exploded view 200 of the unmanned vehicle 100 of FIG. 1. The fuselage 102 bears a number of communications and power interfaces 202 to 214 for supplying power to any installed components such as, for example, components 120 to 128, 132, 134, 136, 138, 140, 108, 104 taken jointly and severally in any and all permutations and for supporting communications between any such installed components. The communications between one or more than one of the installed components 120 to 128 can be supported using, for example, a bus architecture. Embodiments can be realised in which the bus architecture comprises a CANbus and/or another type of medium such as, for example, an Ethernet. The CANbus and Ethernet are merely examples of $1^{st}$ and $2^{nd}$ buses respectively. Other communication buses or protocols can be used as alternatives to the CANbus and/or Ethernet. For example, examples can be realised that use a Universal Serial Bus (USB) for communications and power.

In the embodiment depicted, one of the installed components 122 comprises a sensor 216.

The sensor 216 can be, for example, a camera. The fuselage 102 comprises a respective sensor aperture 218 through which the sensor 216 can operate. Alternatively, or additionally, the fuselage may not comprise any such apertures. Furthermore, embodiments can be realised in which the front portion 104 or the tail portion 108 can comprise a gimballed camera 220.

Figure 3:
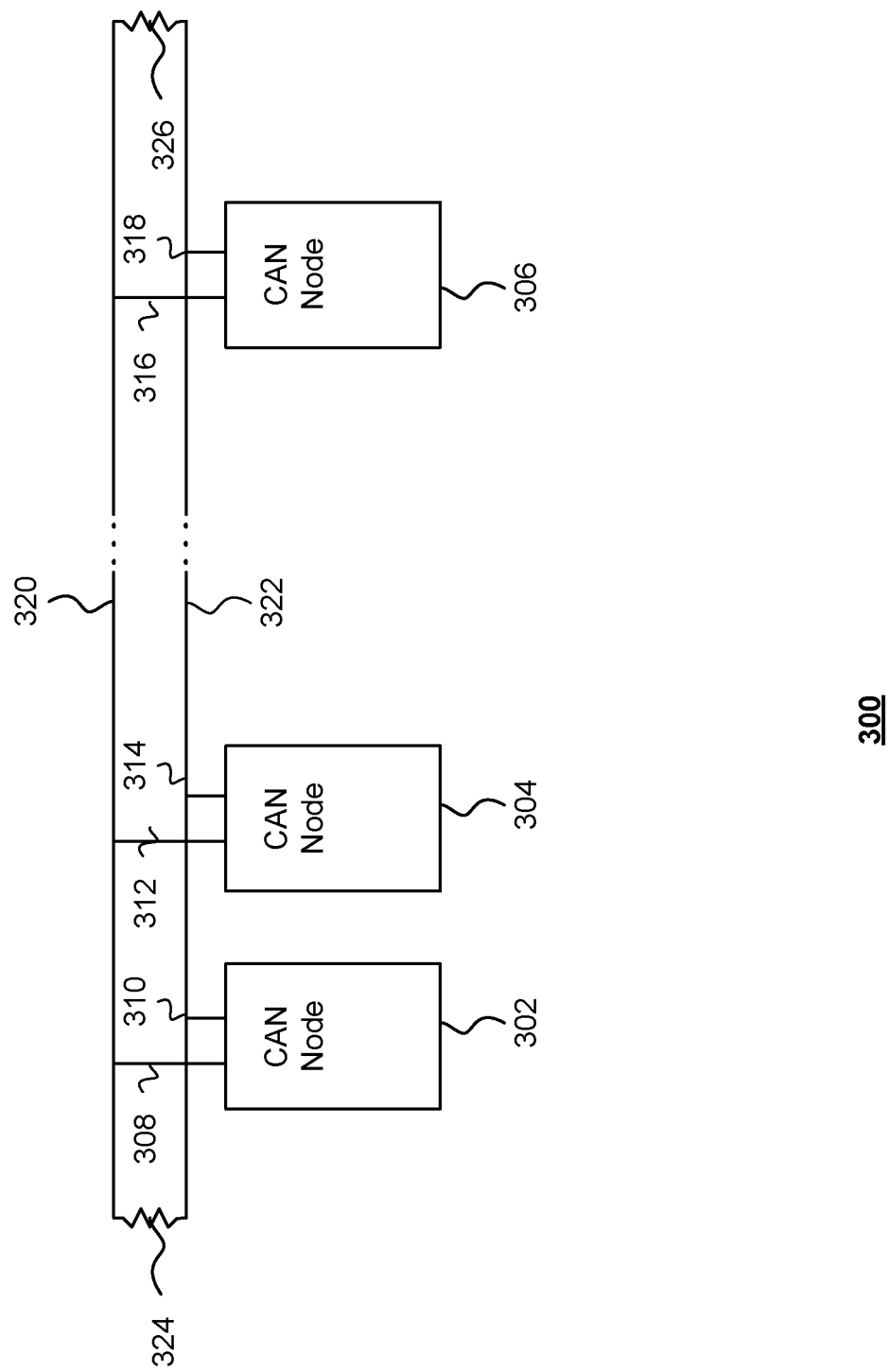
FIG. 3 shows a bus architecture according to embodiments.

FIG. 3 shows a bus architecture 300 according to embodiments. The bus architecture 300 depicted is an example of a CANbus architecture. The bus architecture 300 comprises a number of nodes 302 to 306. Each node can be a CAN node. The nodes 302 to 306 are connected to the bus architecture 300 by respective CAN node connections 308 to 318. A set of 1st CAN node connections 308, 312, 316 are coupled to respective communication lines. When embodiments are realised using a CANbus architecture, the respective communication lines are the CANbus high line 320 and CANbus low line 322. The CANbus high 320 and low 322 lines are terminated via a pair of impedances 324 and 326.

Figure 4:
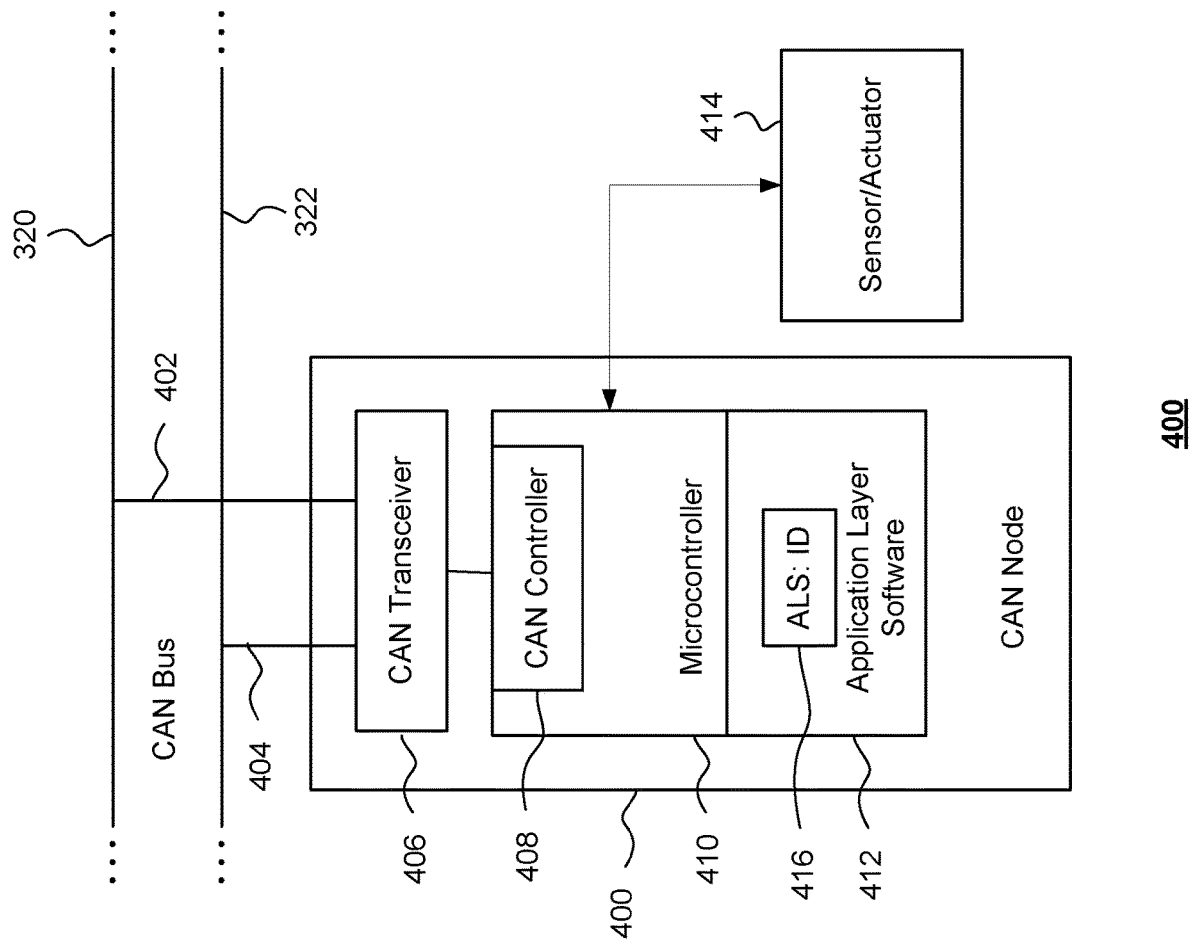
FIG. 4 depicts a node according to embodiments.

FIG. 4 depicts an example of a CAN node 400 according to embodiments. The CAN node 400 can be an example of the above described nodes 302 to 306. The CAN node 400 is coupled to the high 320 and low 322 lines via respective CAN node connections 402 and 404 respectively. The CAN node line connections 402 and 404 are coupled to a CAN transceiver 406. The CAN transceiver 406 is under the control of a CAN controller 408. The CAN controller 408 forms part of a microcontroller 410. The microcontroller 410, under the control of software 412 such as, for example, application layer software, provides a component with, or governs a component's, functionality. For example, embodiments can be realised in which the microcontroller 410, under control of the software 412, interfaces with, or forms part of, at least one or more than one of an installed component, such as the above described components, a sensor or actuator 414 or any other device or software.

It can, therefore, be appreciated that the function of a given component 120 to 128 can be realised by respective application layer software 412. Therefore, a flight controller 132 will run flight controller software as the application layer software. A communications module 136 will run data communication software as the application layer software. A propulsion module will run software for driving or otherwise controlling a means of propulsion as the application layer software. A rotor module or component 138 will run software for driving or otherwise controlling one or more than one rotor as the application layer software. A mission module or component 140 will run software for governing a prescribed mission for the UV 100 as the application layer software. A payload module or component 134 will run software for operating a payload as the application layer software. A gimballed camera component 220 will run software for operating a respective gimballed camera as the application layer software.

The CAN node 400 comprises an identifier 416. The identifier 416 is depicted as forming part of the application layer software 412. However, embodiments are not limited to such an arrangement. Embodiments can be realised in which the identifier 416 forms part of any other aspect or entity of the CAN node 400. The identifier 416 is used to declare or identify the presence of the CAN node 400 on the CANbus to another component such as, for example, an overall controlling or orchestrating component. A flight controller component or module 132 can be an example of such an overall controlling or orchestrating component. However, embodiments are not limited to such an arrangement. Examples can be realised in which the overall controlling or orchestrating component is a component other than the flight controller 132.

FIG. 5 shows an asset table 500 according to embodiments. The asset table 500 is constructed by an overall controlling or orchestrating component as part of a process of determining the presence and identity of any components connected to the CANbus. An installed component is an example of an asset. The asset table 500 comprises a number of rows 502 to 506. Each of the rows 502 to 506 is associated with a respective asset via a respective asset index 508 to 512. Each asset has a number of "present" flags 514 to 518 that are used to indicate the presence of a respective asset on the CANbus. Alternatively, or additionally, each asset has a number of "absent" flags 520 to 524 that are used to indicate the absence of a respective asset on the CANbus. Each asset has a defined respective application programming interface (API) or associated software, in the form of respective application layer software, 526 to 530 that allows the overall controlling or orchestrating component to control respective components coupled to the CANbus.

The API or associated software 526 to 530 can either be stored within the overall controlling or orchestrating component or can be selectively loaded into, or selectively accessed by, the overall controlling or orchestrating component.

Therefore, on, for example, power up or as part of a configuration process, the overall controlling or orchestrating component can identify installed components and configure itself for interacting with those installed components.

Figure 6:
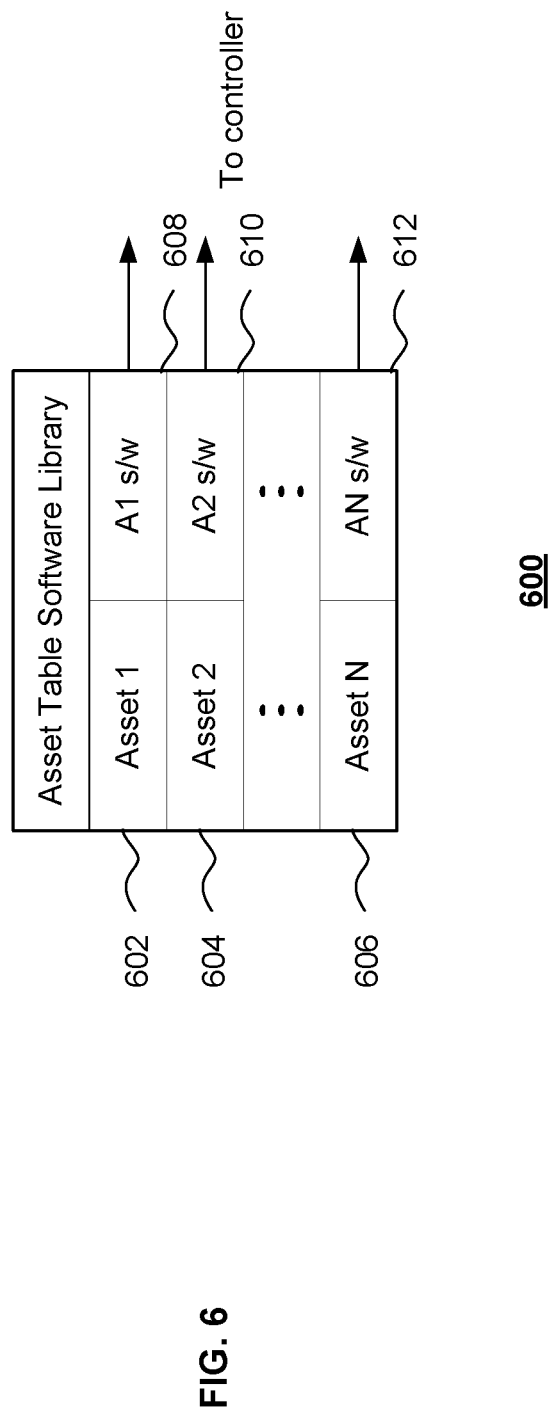
FIG. 6 shows an asset inventory according to embodiments.

FIG. 6 shows an asset inventory 600 according to embodiments. The asset inventory 600 comprises a number of asset indices 602 to 606 that are used to access respective asset application layer software 608 to 612 for configuring an overall controlling or orchestrating component according to installed components detected as being connected to the CANbus.

Figure 7:
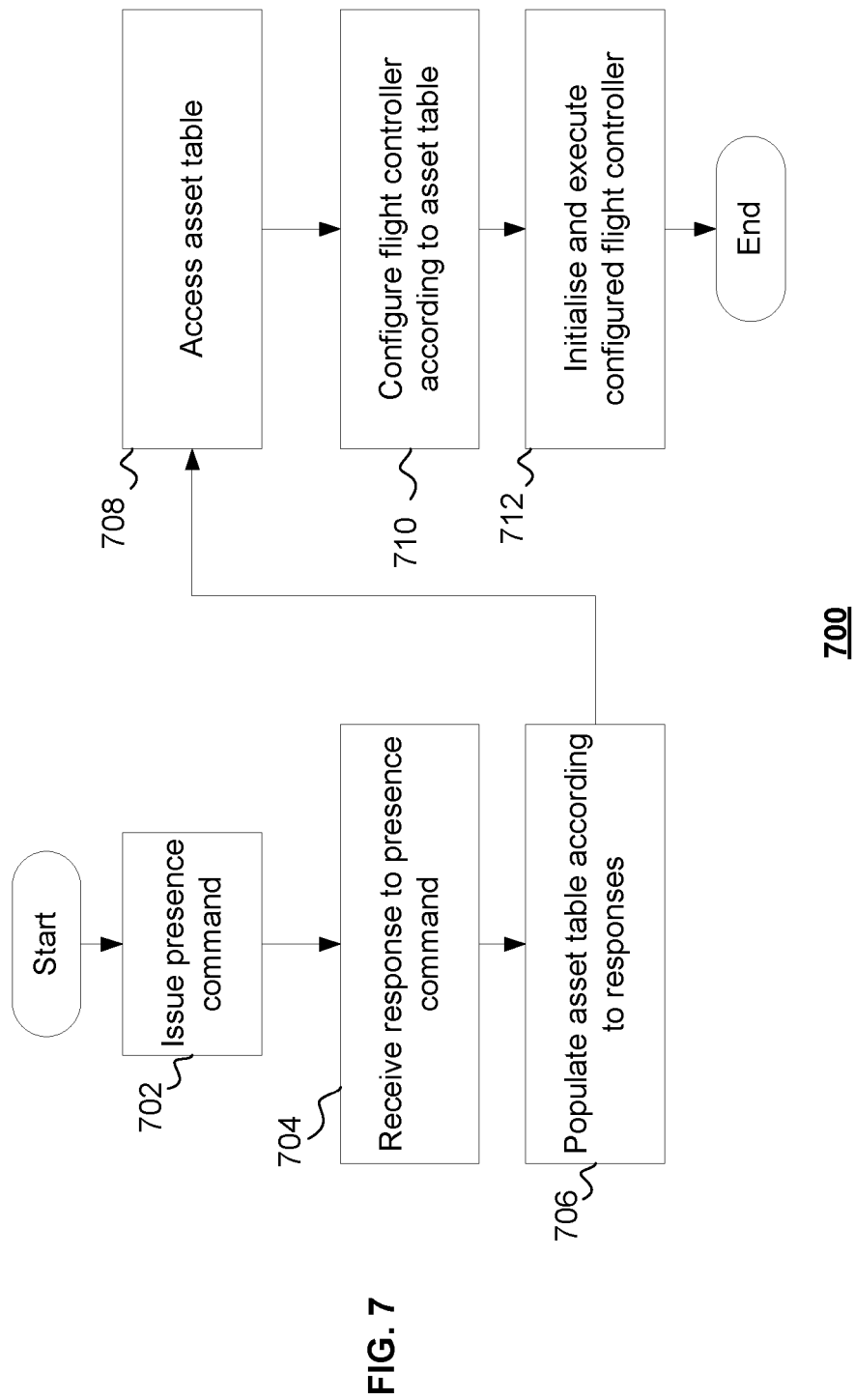
FIG. 7 depicts a flowchart according to embodiments.

FIG. 7 depicts a flowchart 700 according to embodiments for configuring an overall controlling or orchestrating component. The overall controlling or orchestrating component issues a command for installed components 120 to 128 to identify themselves at 702. Any installed components will respond to the command with their respective identifiers 416 via the CANbus. Those respective identifiers 416 are received by the overall controlling or orchestrating component at 704. The received respective identifiers 416 are used to populate, at 706, the asset table 500 with appropriate "present" and/or "absent" entries and to configure the overall controlling or orchestrating component with appropriate software taken from, or otherwise associated with, the asset table software library 600. Therefore, the overall controlling or orchestrating component will access the asset table software library 600 at 708 and configure itself according to the assets identified as being present in the asset table 500 at 710. Thereafter, the overall controlling or orchestrating component can initialise and begin its orchestrating function at 712.

Figure 8:
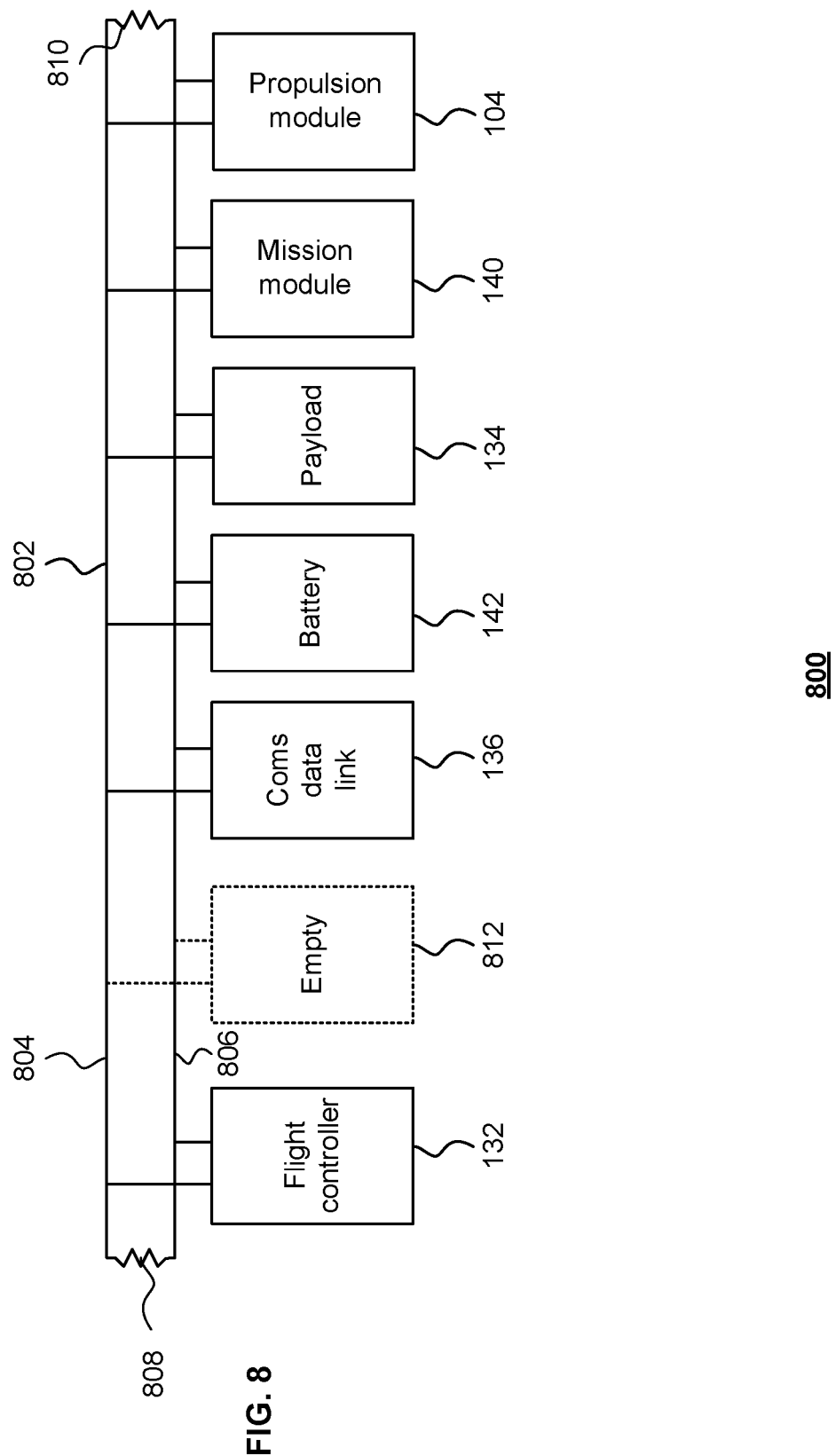
FIG. 8 illustrates a further bus architecture according to embodiments.

FIG. 8 illustrates a further bus architecture 800 according to embodiments. The bus architecture 800 can be any bus architecture that supports communication, command and control between nodes connected to the bus such as, for example, any bus architecture described herein. It can be appreciated that the bus architecture 800 comprises a CANbus 802, having high and low lines 804 and 806, terminated by respective impedances 808 and 810.

The CANbus 802 will be housed in the fuselage 102 as described above. The bay 118 can be populated with installed components 120 to 128. In the embodiment illustrated, the installed components comprise a flight controller 132, a payload 134, a communications module 136, a mission module 140, a battery 142, and a propulsion module 104. It can be appreciated that the bay 118 (not shown) comprises an empty component position 812. It can be appreciated that the installed components can be positioned in a manner to influence weight distribution within, or the centre of gravity of, the UV, or the positions of points or moments of thrust or torque vectoring. Suitably, in the example shown, the battery 142 is centrally disposed. The empty component position 812 can remain empty in the assembled UV 100 or can be populated with an empty component housing, which might influence or otherwise improve aerodynamics.

The installed components can be selected from a set of possible components and installed to meet mission or task requirements, which can have the advantage that complete (mission or task specific) unmanned vehicles do not have to form part of an inventory, which leads to significant space savings within a limited or constrained environment such as, for example, on board a ship.

Figure 9:
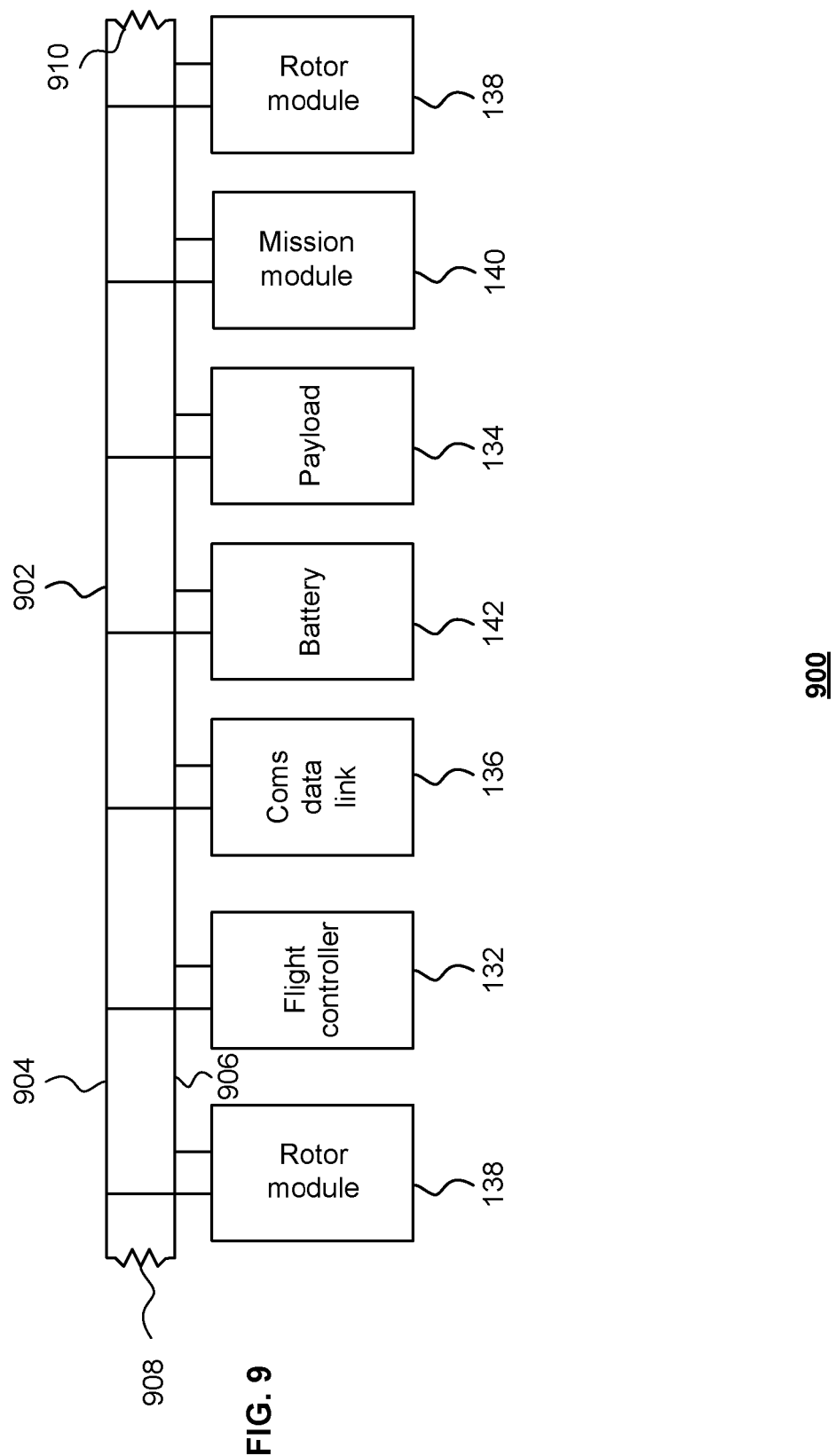
FIG. 9 shows a still further bus architecture according to embodiments.

FIG. 9 shows a still further bus architecture 900 according to embodiments. The bus architecture 900 can be any bus architecture that supports communication, command and control between nodes connected to the bus such as, for example, any bus architecture described herein. It can be appreciated that the bus architecture 900 comprises a CANbus 902, having high and low lines 904 and 906, terminated by respective impedances 908 and 910.

The CANbus 902 will be housed in the fuselage 102 as described above. The bay 118 can be populated with installed components 120 to 128. The installed components of the example depicted comprise a pair rotor modules 138, a flight controller 132, a communications module 136, a payload 134, a battery 142, and a mission module 140. It can be appreciated that the installed components can be positioned in a manner to influence weight distribution within, or the centre of gravity of, the UV or the positions of points or moments of thrust or torque vectoring. Suitably, in the example shown, the battery 142 is centrally disposed. It can be appreciated that the rotor modules 138 have been disposed at either end of the fuselage 102, which can have the advantage of balancing, or otherwise controlling, the points or moments associated with thrust or torque vectoring.

The installed components can be selected from a set of possible components and installed to meet mission or task requirements, which can have the advantage that complete (mission or task specific) unmanned vehicles do not have to form part of an inventory, which leads to significant space savings within a limited or constrained environment such as, for example, on board a ship.

Although the example depicted in FIG. 9 uses two rotor modules 138, which will drive one or more than one respective rotor, examples can be realised in which one or some other number of rotor modules is or are used in configuring the UV 100. Similarly, although the example shown in FIG. 8 uses a single propulsion module 104, which will drive one or more than one respective propeller, examples can be realised in which one or some other number of propulsion modules is or are used in configuring the UV 100.

Figure 10:
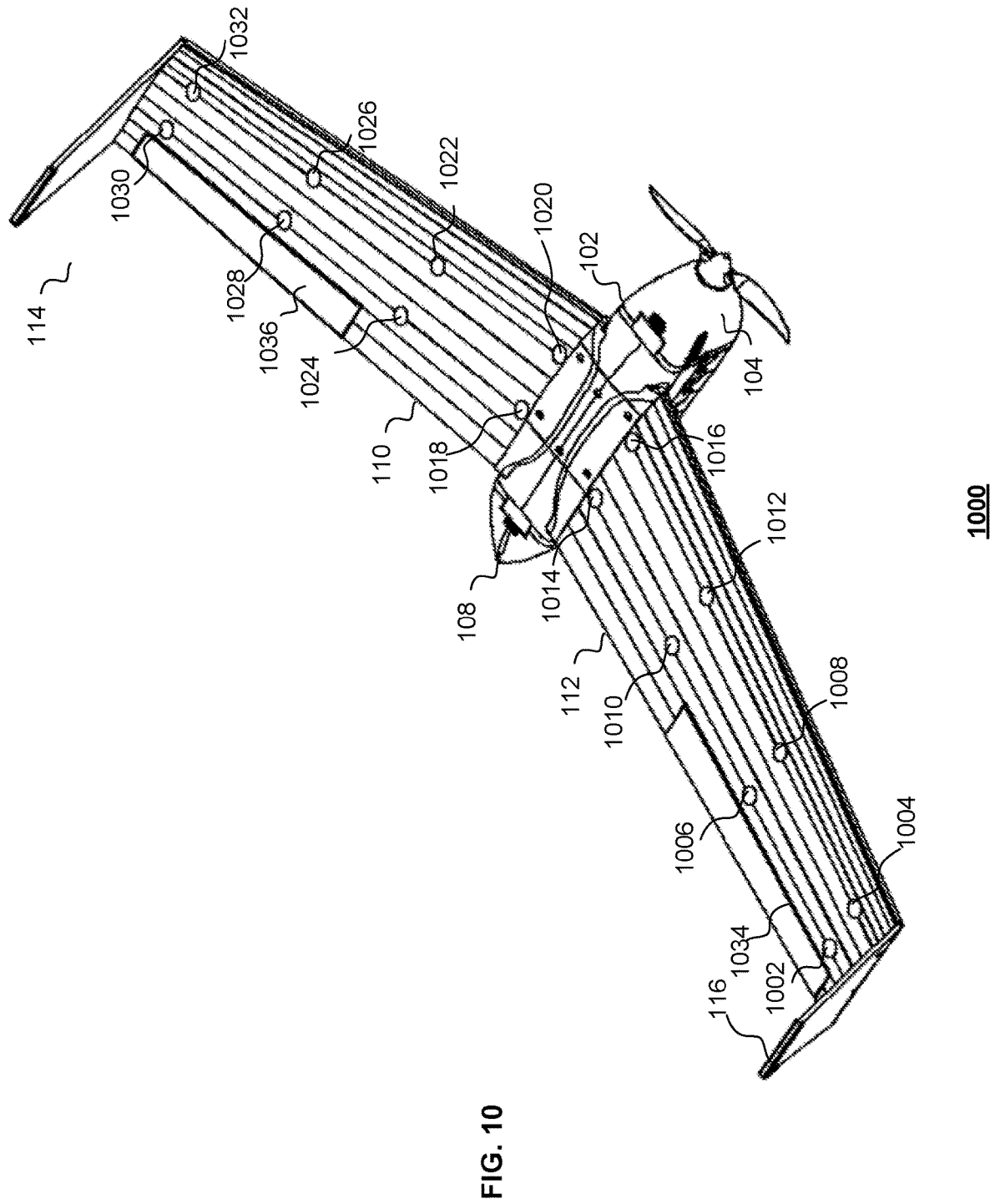
FIG. 10 depicts an assembled unmanned vehicle according to embodiments.

FIG. 10 depicts an assembled unmanned vehicle 1000 according to an example. It can be appreciated that the installed components are not visible because they are installed at the underside of the vehicle. The assembled unmanned vehicle is an example of the UVs described herein. The vehicle 1000 comprises the above mentioned fuselage 102, bearing propulsion module 104. The wings 110 and 112, together with respective winglets 114 and 116 are also shown. The example shown also comprises a tail portion 108.

It can be appreciated that the assembled wings 110 and 112 are held in an assembled state using a number of fasteners 1002 to 1032, which will be described in detail later.

The wings 110 and 112 also comprise respective ailerons 1034 and 1036.

Although the propulsion module 104 is positioned at the front of the fuselage 102, examples can be realised in which the propulsion module 104 is positioned elsewhere on the vehicle 1000. For instance, examples can be realised in which the propulsion module 104 is disposed at the rear of the fuselage 102, replacing the tail portion 108, which would leave the front portion available for some other module such as, for example, a nose cone or a module bearing a sensor or instruments like, for example, the gimballed camera 220. Similarly, rather than bearing a tail portion 108, the fuselage 102 can be arranged to have a different module bearing, for example, such a sensor or other instrument.

Figure 11:
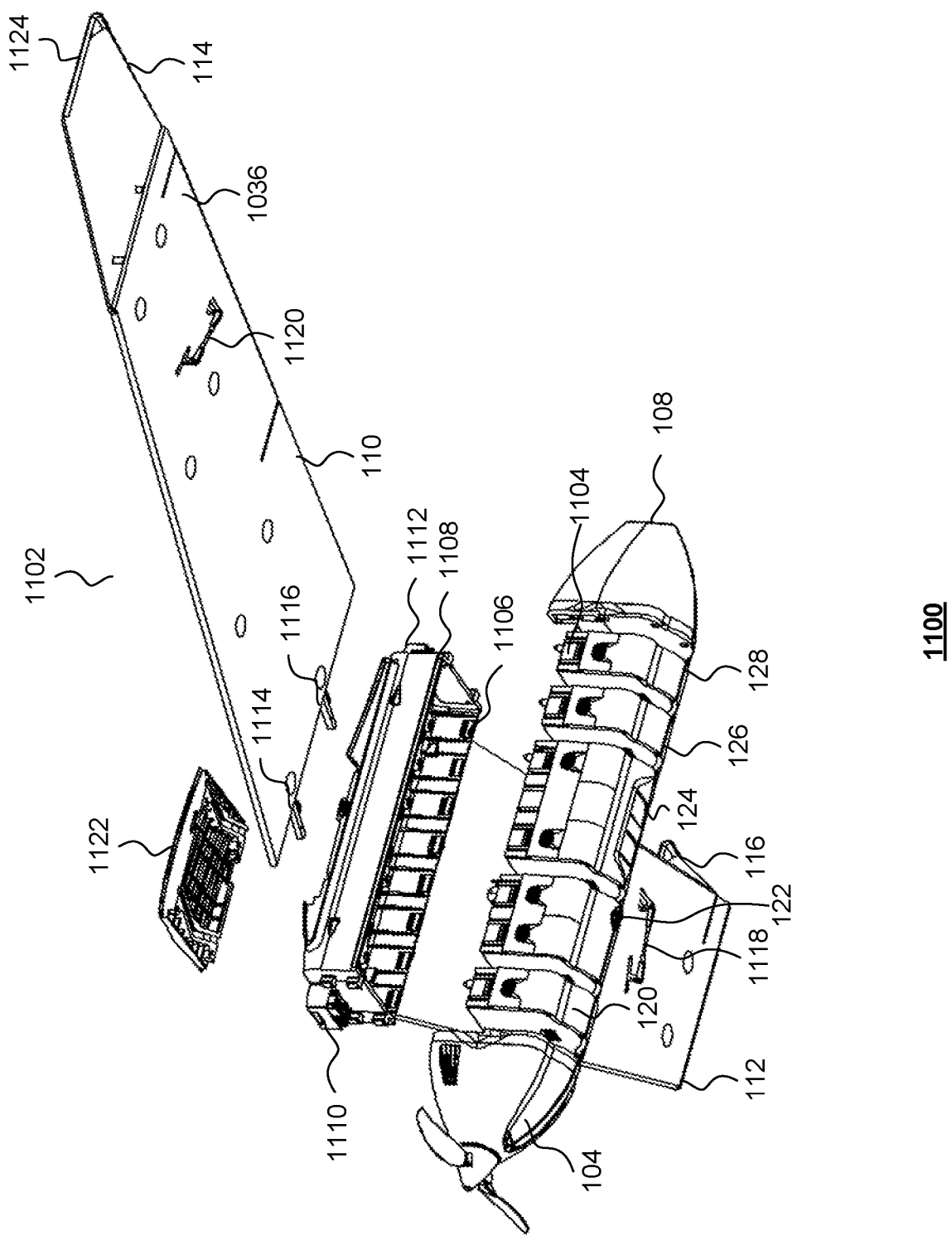
FIG. 11 shows a further exploded view of an unmanned vehicle according to embodiments.

FIG. 11 shows a further exploded view 1100 of an unmanned vehicle 1102 according to embodiments. The vehicle 1102 can be an example of any of the unmanned vehicles disclosed herein. The vehicle 1102 comprises the fuselage 102, the front portion 104, the tail portion 108, wings 110 and 112 and respective winglets 114 and 116. The installed components 120 to 128 are also shown. Therefore, the bay 118 is fully populated.

It can be appreciated that the components or modules can vary in size. In the illustrated example, the components or modules are sized in terms of an integral number of the smallest unit that can be accommodated according to the distribution of connectors (not shown) on the bus architecture. Therefore, it can be seen that modules 120, 126 and 128 are single unit-sized components, whereas component 122 is a two unit-sized module and component 124 is a triple sized module.

Each component can be coupled to the fuselage 102 via complementary formations on the component and fuselage 102. In the example, shown a lip 1104, disposed on the module, is arranged to engage with a complementary recess 1106 on the inside wall of the fuselage 102. In the example shown the lip 1104 is carried by a resiliently deformable member (not shown) that can be flexed to allow insertion and removal of a respective component into and from the bay 118 of the fuselage 102.

The fuselage 102 and components bear further complementary cooperating formations in the form a further lip 1108 for engaging with a complementary recess (not shown) in the components to prevent or at least reduce flexing or movement between the fuselage 102 and components.

The components are coupled to the fuselage 102 using an upward action. For example, it can be appreciated that the CANbus connectors or interfaces 1110 and 1112 for the front portion 104 and the tail portion 108 are disposed such that an upward motion is required to couple those portions 104 and 108 to the fuselage 102. This has the advantage over a downward coupling motion during, for example, landing when at least one of the front portion 104 and tail portion 108 can impact the ground. Any such impact merely urges the front 104 or tail 108 portions towards the connectors 1110 and 1112 rather than risking decoupling them if they were the other way around.

Each of wings 110 and 112 is connected to the fuselage 102 via spars; two 1114 and 1116 of which are visible for the left wing. Also shown on the pressure side of the wings are linkages 1118 and 1120 for controlling the ailerons 1034 and 1036.

A wing box 1122 is provided for securing the wing spars 1114 to 1116 to the fuselage 102.

The wing box 1122, in one example, is a covering plate. However, embodiments can be realised in which the wing box is shaped to house or expose a sensor or instrument.

It can be appreciated that the winglet 114 comprises a winglet fastener 1124 for keeping the winglet parts together.

Figure 12:
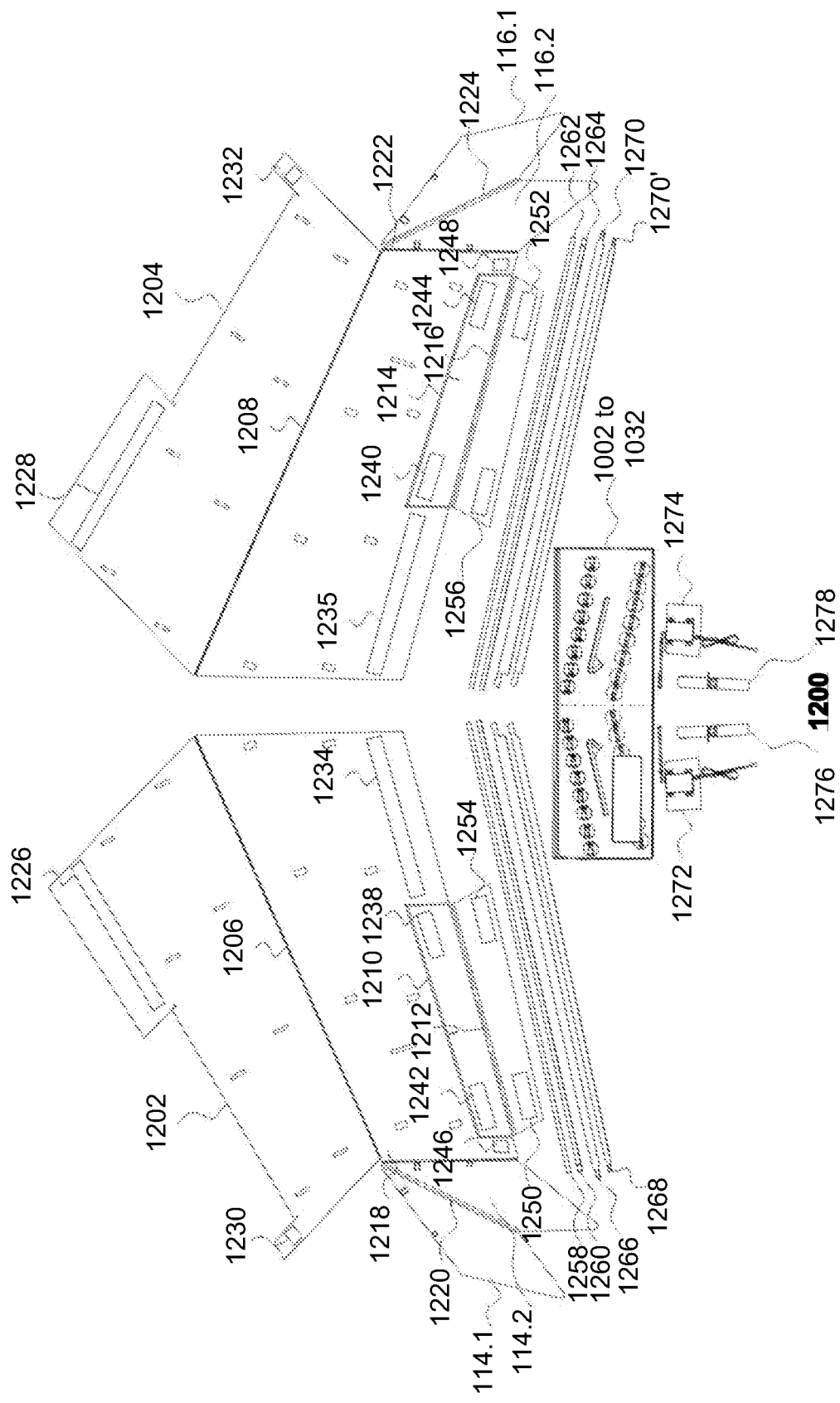
FIG. 12 illustrates a kit of parts for a foldable wing according to embodiments.

FIG. 12 illustrates a kit of parts 1200 for foldable wings 1202 and 1204 according to embodiments. The wings 110 and 112 described in this application can be formed from such foldable or flat-pack wings 1202 and 1204. The kit of parts 1200 comprises a pair of foldable wings 1202 and 1204. The foldable wings 1202 and 1204 are scored using a plurality of scores. The plurality of scores comprise leading edge scores 1206 and 1208, pairs of aileron scores 1210, 1212 and 1214 and 1216 and pairs of winglet scores 1218, 1220 and 1222, 1224. The winglet scores 1218, 1220 and 1222, 1224 define winglet control surfaces 114.1, 114.2 and 116.1, 116.2. The wings 1202 and 1204 can further comprise substantially planar fasteners for holding the wings 1202 and 1204 in an assembled form. In the illustrated example, the plurality of planar fasteners can comprise complementary portions of Velcro™, such as, for example, the fasteners 1226 to 1256 identified.

The kits of parts 1200 also comprises, for each wing, one or more than one structural spar and one or more than one locating spar. In the example illustrated, each wing comprises a pair of structural spars 1258, 1260 and 1262, 1264 and a pair of locating spars 1266, 1268 and 1270, 1272. The structural spars can be formed from carbon fibre. The locating spars can be formed from polycarbonate.

The kit of parts 1200 can further comprise a plurality of fasteners such as, for example, the above described fasteners 1002 to 1032 for holding the wings in assembled states. In particular, the fasteners 1002 to 1032 can urge the anterior/suction and inferior/pressure surfaces of the wing together. Furthermore, the fasteners 1002 to 1032 can hold the spars 1258 to 1270, or at least selected spars, in position in an assembled state. The spars can be shaped or profiled to prevent sliding or other movement within the assembled state. For example, the spars can bear features that cooperate with the fasteners to prevent, or at least restrict, movement of the spars in the assembled state.

The kit of parts 1200 can further comprise a pair of servos 1272 and 1274 together with respective linkages and aileron couplings 1276 and 1278.

Examples can be realised in which the kit of parts comprises one or more than one of any element or feature of the wing taken jointly and severally in any and all permutations.

Figure 13:
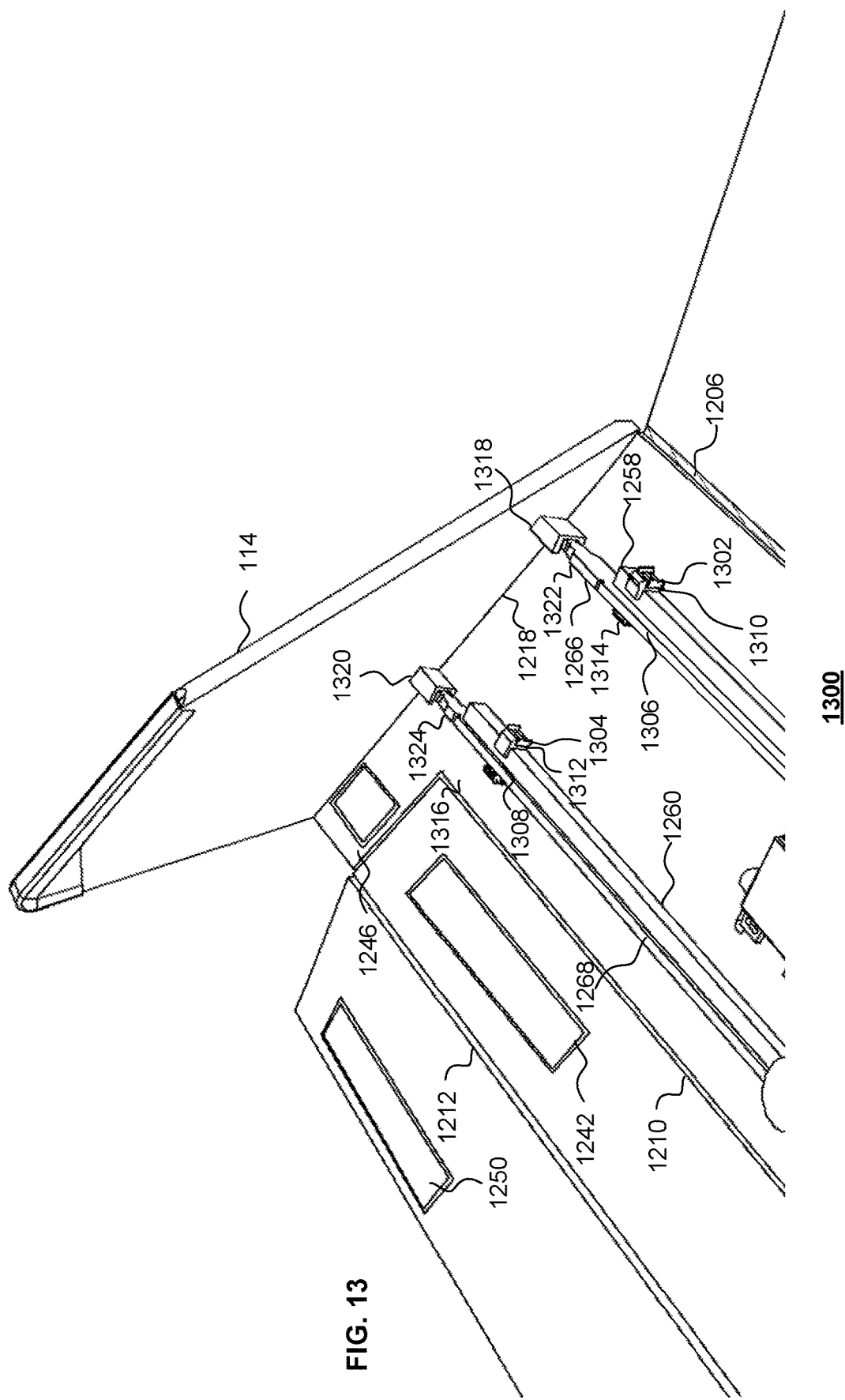
FIG. 13 shows a close-up of part of the foldable wing according to embodiments.

FIG. 13 shows a close-up view 1300 of part of one 1202 of the foldable wings 1202 and 1204 according to embodiments. Reference numerals common to FIGS. 12 and 13 refer to the same element. It can be appreciated that the spars 1258, 1260 and 1266, 1268 are held in place by corresponding fasteners 1302, 1304, which form part of the set of fasteners 1002 to 1032. The fasteners 1302, 1304 present an open mouth 1306, 1308 via which structural spars 1258, 1260 can be inserted into corresponding recesses or jaws 1310, 1312 of the fasteners 1302, 1304. The locating spars 1266 and 1268 are inserted into the mouths 1306, 1308 adjacent to the structural spars 1258, 1260 and arranged to keep the latter in position by being urged towards the latter via resiliently deformable abutment members 1314, 1316.

The locating spars 1266, 1268 are coupled to the winglet 114 via respective fasteners 1318, 1320. The fasteners 1318, 1320 are arranged to receive respective ends 1322, 1324 of the locating spars 1266, 1268. The respective ends 1322, 1324 can be profiled or otherwise shaped to improve the fit or coupling with the fasteners 1318, 1320.

Figure 14:
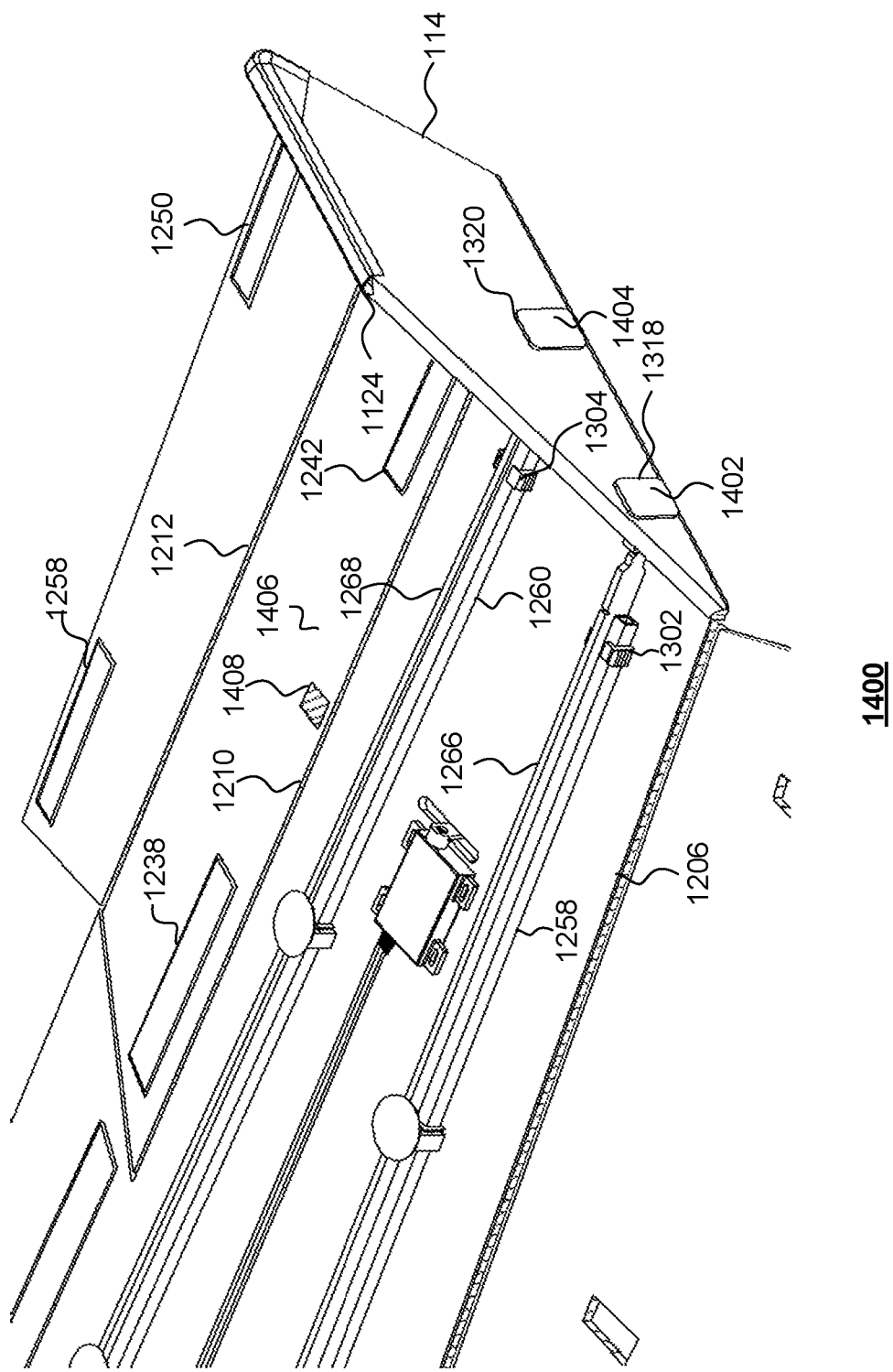
FIG. 14 depicts a further close-up of part of the foldable wing according to embodiments.

FIG. 14 depicts a further close-up view 1400 of the same part of one 1202 of the foldable wing 1202, 1204 according to embodiments. Reference numerals common to FIGS. 12, 13 and 14 refer to the same element. It can be appreciated that the fasteners 1318, 1320 comprise substantially planar load bearing elements 1402, 1404 arranged to maintain the winglet 114 in position.

FIG. 14 additionally depicts the winglet fastener 1124.

Figure 15:
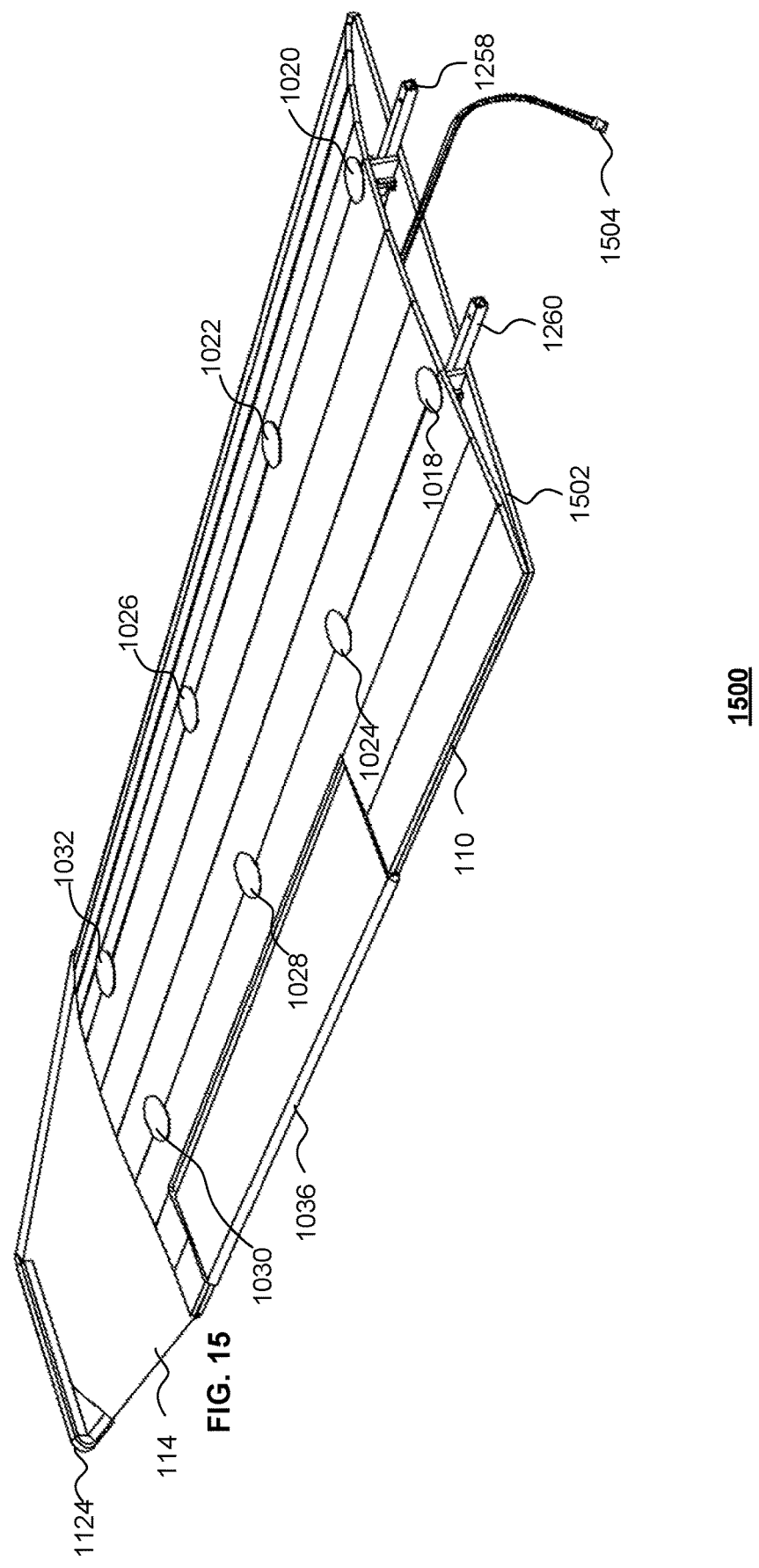
FIG. 15 illustrates an assembled wing according to embodiments.

FIG. 15 illustrates a view 1500 of an assembled wing 110 according to embodiments.

Reference numerals common to other drawings refer to the same element. It can be appreciated that the structural spars project 1258, 1260 from the fuselage facing end 1502 of the wing 110. Furthermore, a power coupling 1504 is provided that is connected to a corresponding servo 1276 for connection to the bus architecture so that the aileron 1036 can be controlled.

Figure 16:
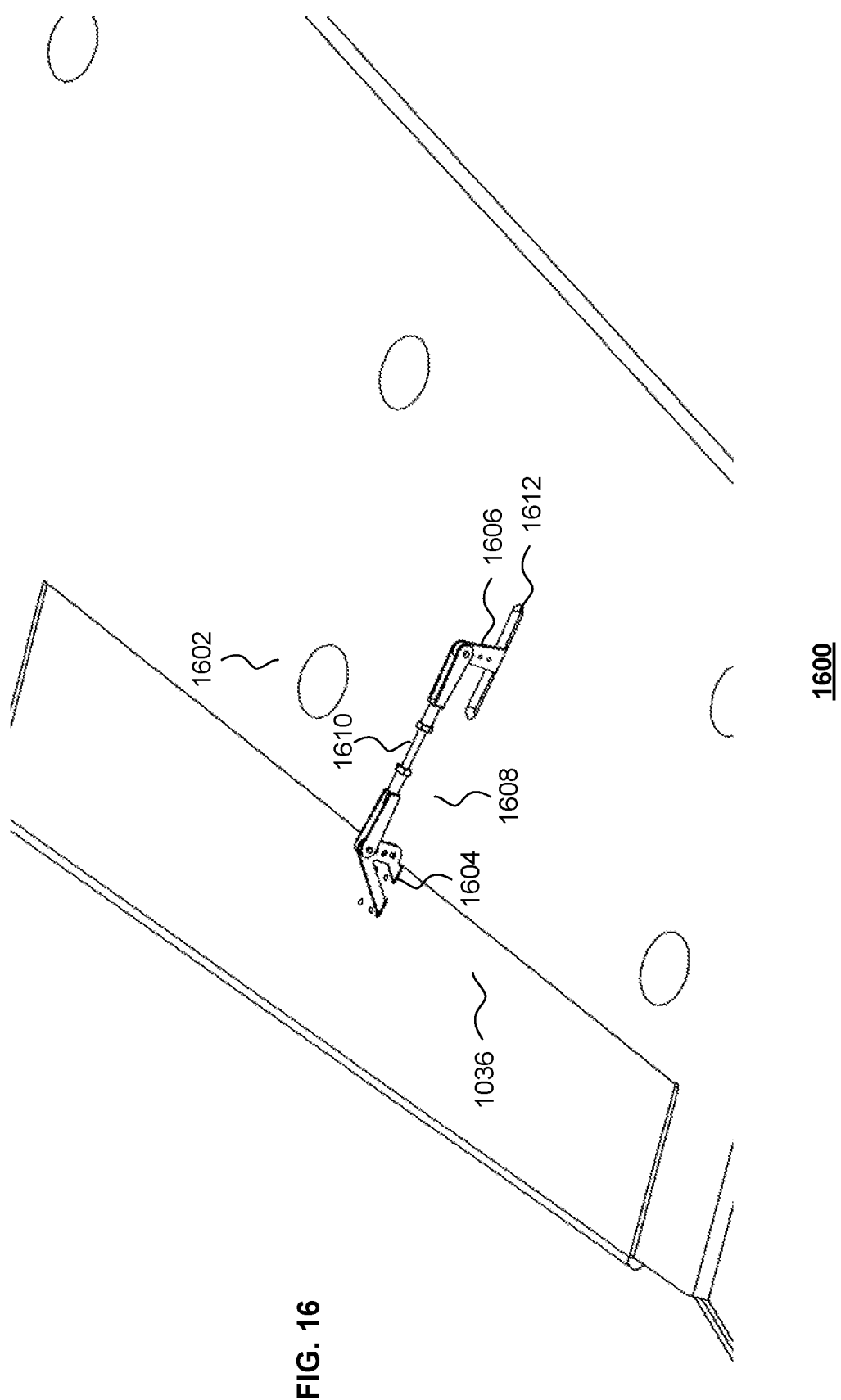
FIG. 16 depicts aileron actuation linkages according to embodiments.

FIG. 16 depicts a view 1600 of aileron actuation linkages 1602 according to embodiments. The aileron actuation linkages 1602 are disposed beneath the wing 110. The aileron actuation linkages 1602 comprise a horn 1604 coupled internally to the aileron 1036. The horn 1604 is coupled to a servo arm 1606 via a clevis 1608 bearing an adjustable length threaded portion 1610. The servo arm 1606 depends from an internal servo (not shown). The servo arm 1606 extends through the inferior/pressure surface of the wing 110 through a corresponding servo arm aperture 1612.

Figure 17:
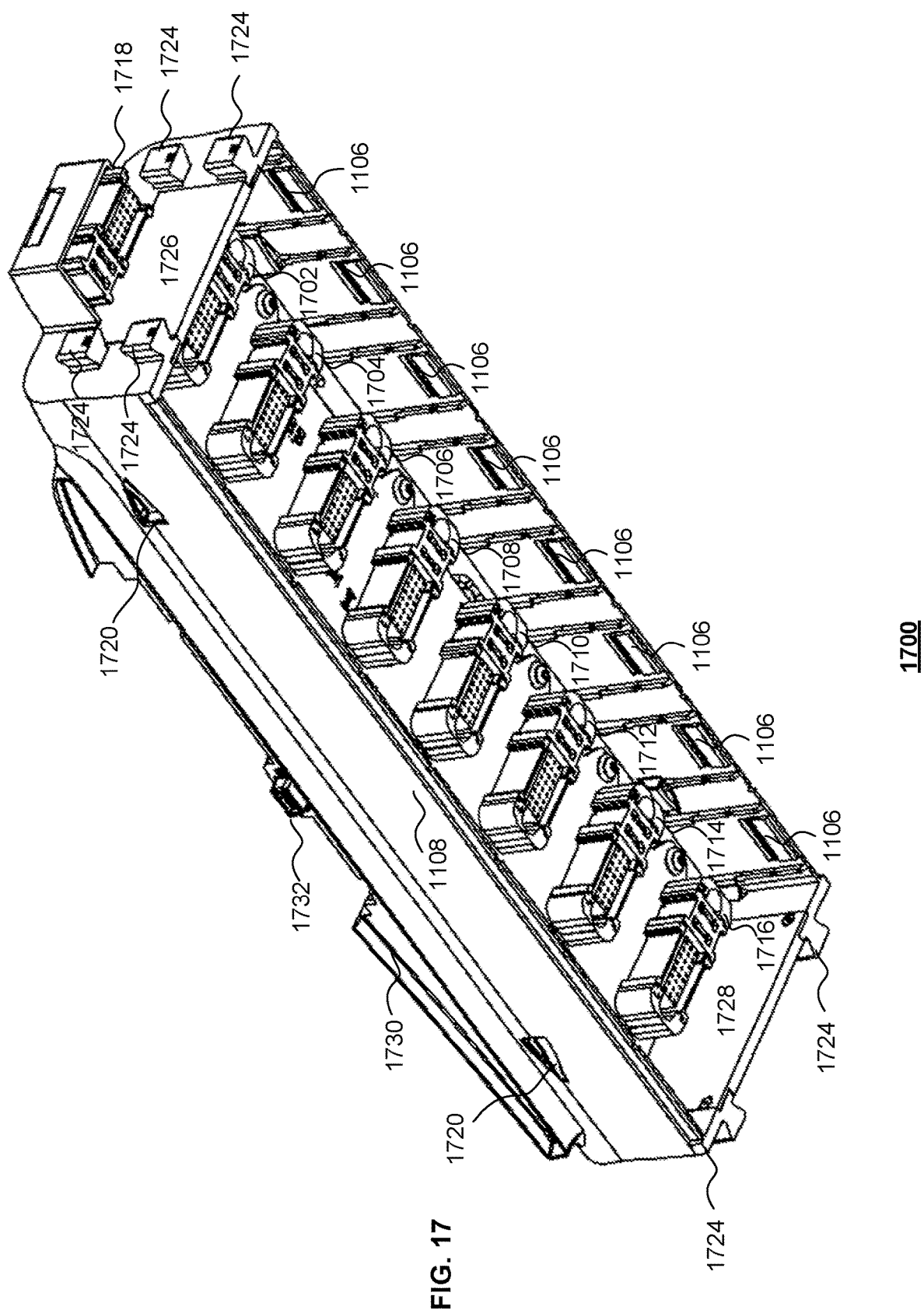
FIG. 17 illustrates a fuselage with a bay according to embodiments.

FIG. 17 illustrates a view 1700 of the fuselage 102 with the bay 118 according to embodiments. The bay 118 comprises the bus architecture, which bears a number of connectors 1702 to 1716 for receiving corresponding connectors of installed components (not shown). Two further connectors are provided, which are connectors to accommodate components or modules at either end of the fuselage such as, for example, the front portion 104, tail portion 108 or any other component or module; only one 1718 of the two further connectors is visible in FIG. 17.

The visible interior wall of the bay 118 bears multiple instances of the above described recess 1106 for securely receiving the lips 1104 of any install components. The opposite interior wall of the bay 118 can contain such recesses 1106 for receiving corresponding lips 1104 of installed components. The fuselage 102 is provided with a number of cooling vents or ducts to provide for a cooling air flow. Two such vents or ducts 1720, 1722 are visible.

The fuselage 102 can also bear a number of couplings 1724 for securing components to the front 1726 and end 1728 walls of the fuselage 102. In the example illustrated the couplings 1724 are dove tails that are arranged to couple with complementary recesses on components intended to be disposed at the front and end of the UV 100 such as, for example, the front portion 104, tail portion 108, a gimballed camera 220 or any other component.

The fuselage 102 has a wing receiving recess 1730 for receiving the fuselage directed end 1502 of the wing 110. A power coupling 1732 is provided for receiving the power coupling 1504 associated with the servo.

The fuselage 102 better depicts the lips 1108 extending along its length. It will be recalled that the lips 1108 are intended to couple with a complementary formation or recess of any installed components.

Figure 18:
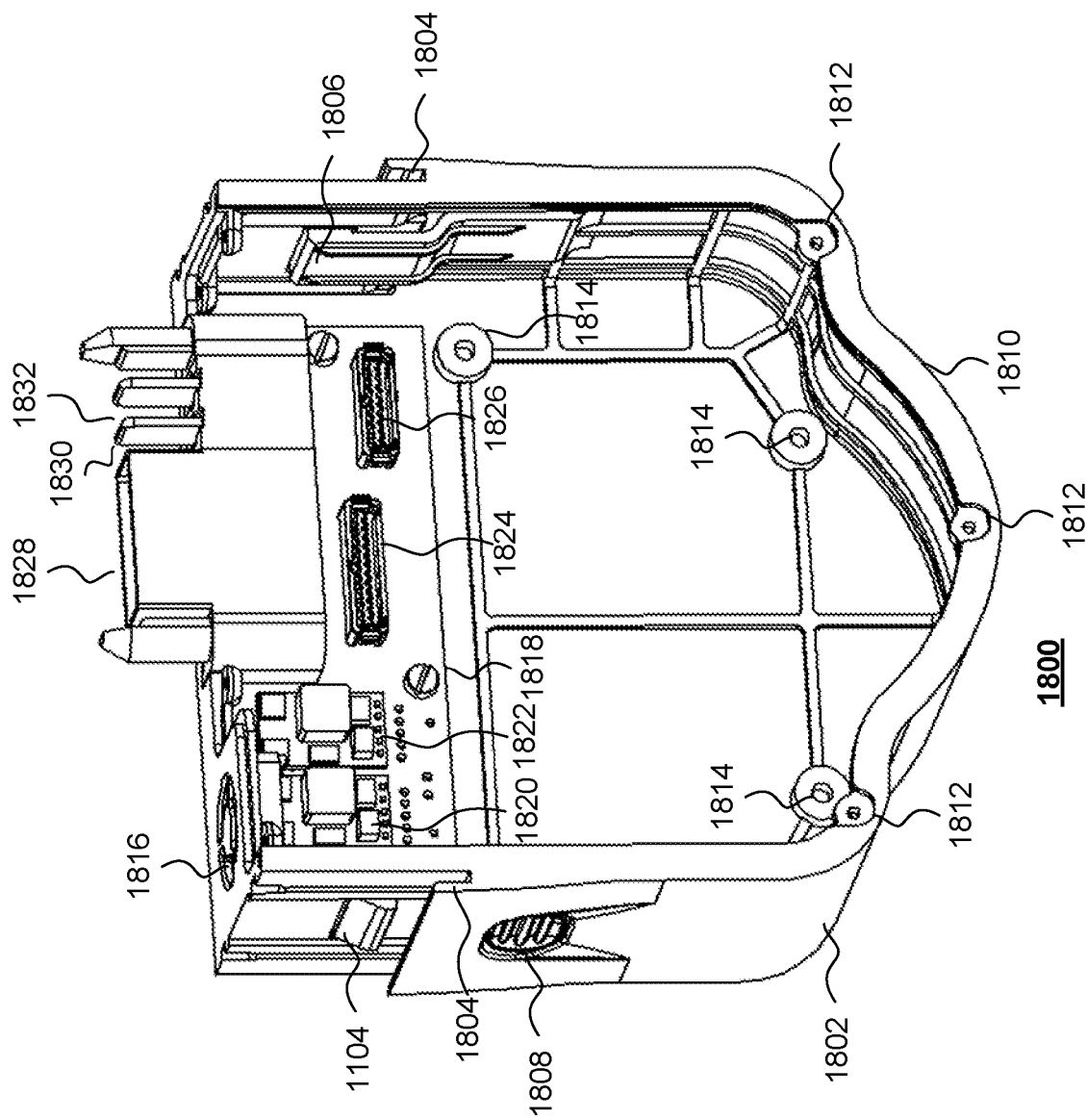
FIG. 18 depicts a component or module according to embodiments.

FIG. 18 depicts a view 1800 of a component or module housing 1802 according to embodiments. The lips 1108 of the fuselage 102 are intended to engage with corresponding complementary formations or recesses 1804 of the component housing 1802. It will be recalled that the lip 1104 is carried by a resiliently deformable member 1806 that can be flexed to allow insertion and removal of a respective component into and from the bay 118 of the fuselage 102. A button 1808 is provided on one or more than one of the resiliently deformable members 1806 to allow it to be flexed when removing an installed component from the bay 118.

The underside 1810 of the housing 1802 is profiled to present a more resilient surface to protect against impact damage that might be sustained during landing. A number of screw holes 1812 are presented for receiving screws to secure a covering plate, if any, to close the housing. A number of bosses 1814 are provided for receiving screws or other fasteners for mounting an adaptor PCB containing electronics specific to the function of a module such as, for example, the hardware and software for realizing a CAN node. A vent 1816 can be provided for cooling. The vent 1816 can be associated with a cooling fan (not shown).

The housing 1802 is shown as having a PCB 1818 for connecting the electronics of an adaptor PCB to the bus architecture. The PCB 1818 can comprise one or more than one voltage regulator; two such regulators 1820, 1822 are shown. Additionally, or alternatively, the PCB 1818 can comprise one or more than one interface 1824, 1826 electrically coupled to the connector 1828 for coupling to the bus architecture. The connector 1828 also has two power pins 1830, 1832 for supplying power to the PCB 1818 and any adaptor PCB.

Figure 19:
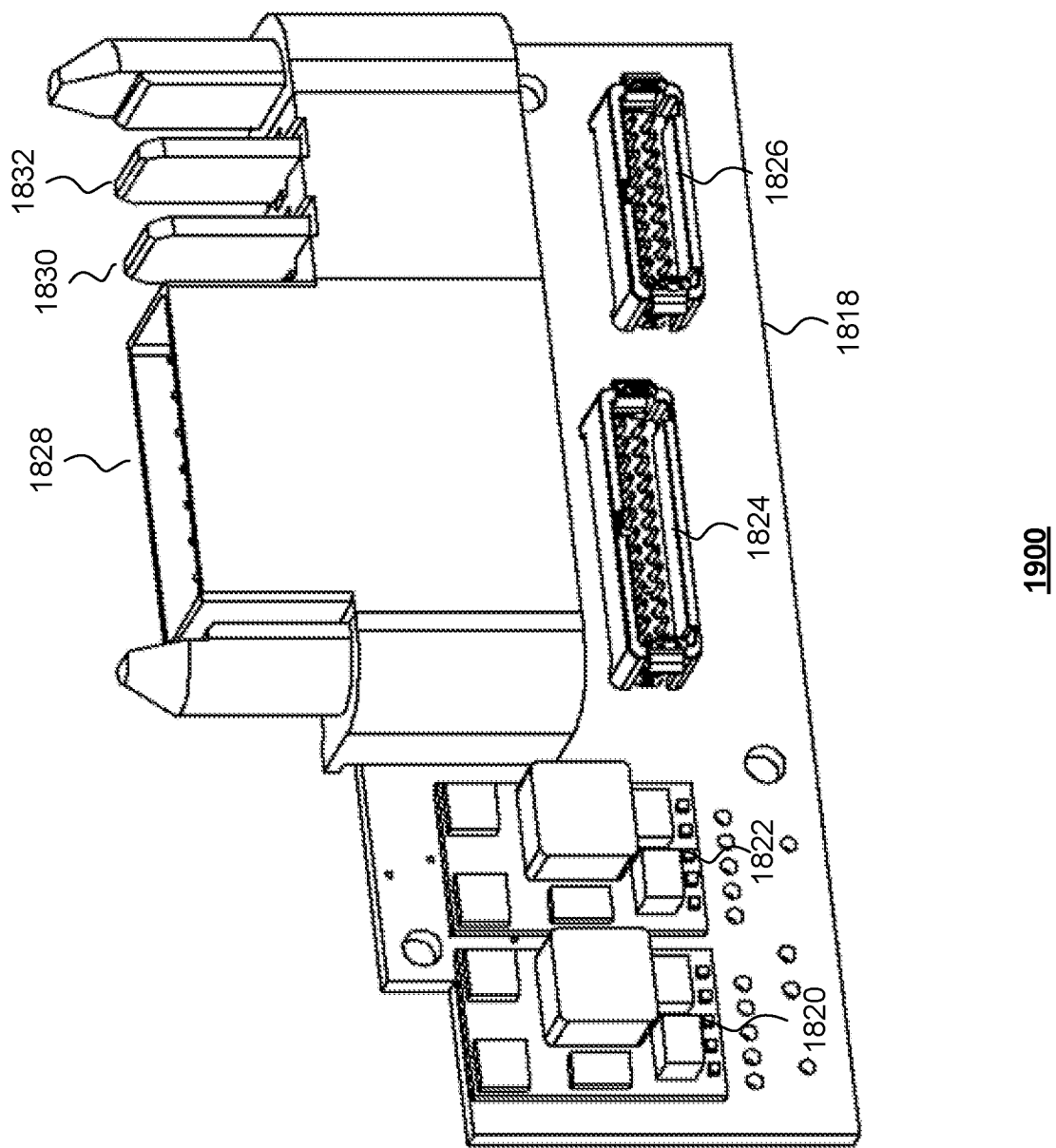
FIG. 19 depicts a connector according to embodiments.

FIG. 19 shows a view 1900 of the connector 1828 and PCB 1818 of FIG. 18. Like reference numerals relate to the same features.

Figure 20:
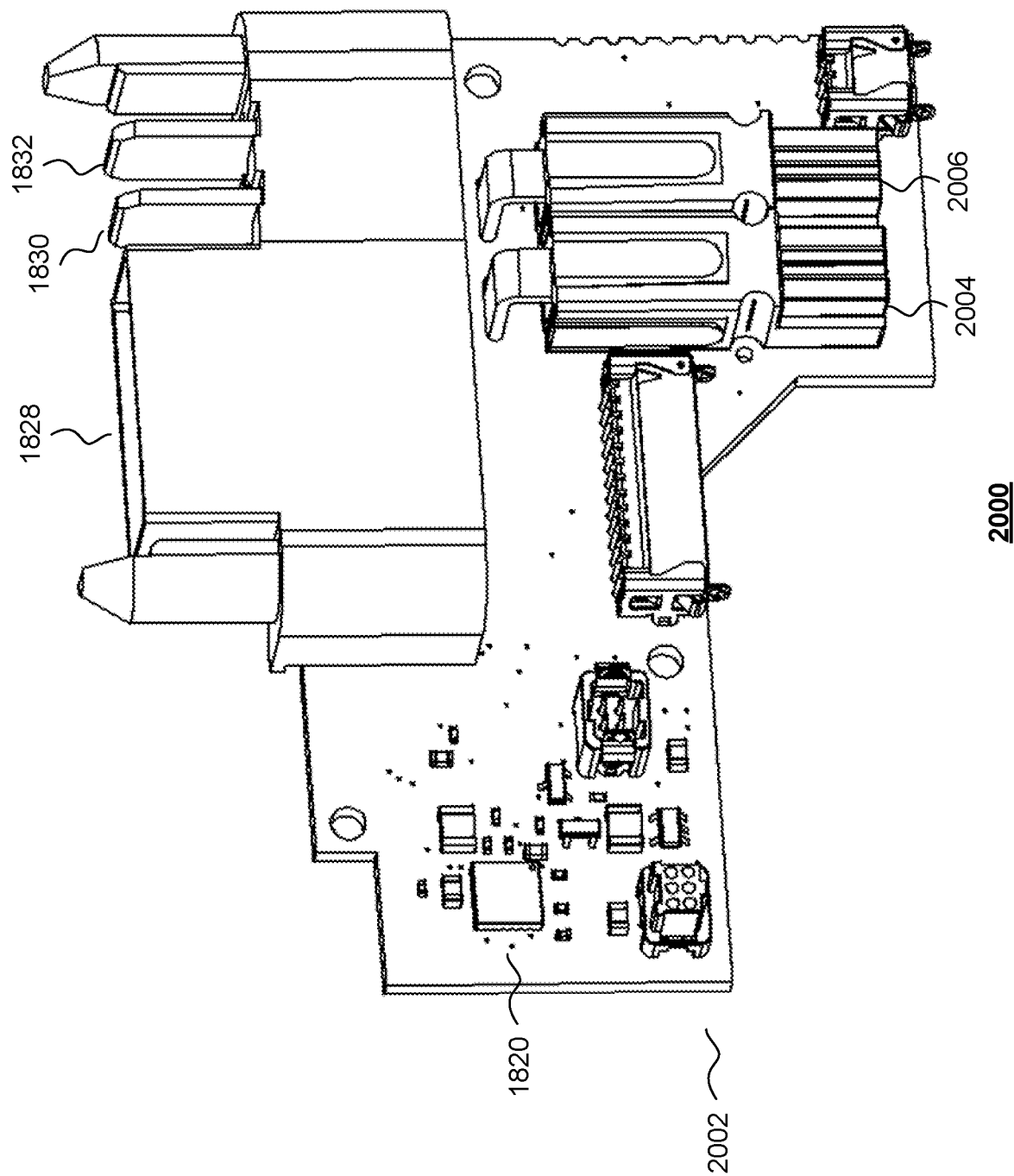
FIG. 20 depicts a further connector according to embodiments.

FIG. 20 depicts a view 2000 of a further connector 2002 according to embodiments. Like reference numerals correspond to the same features as previously described. It can be appreciated that two heavy duty power connectors 2004, 2006 are provided for supplying power to any motors associated with at least one of the propulsion module 104 or rotor module 138.

Figure 21:
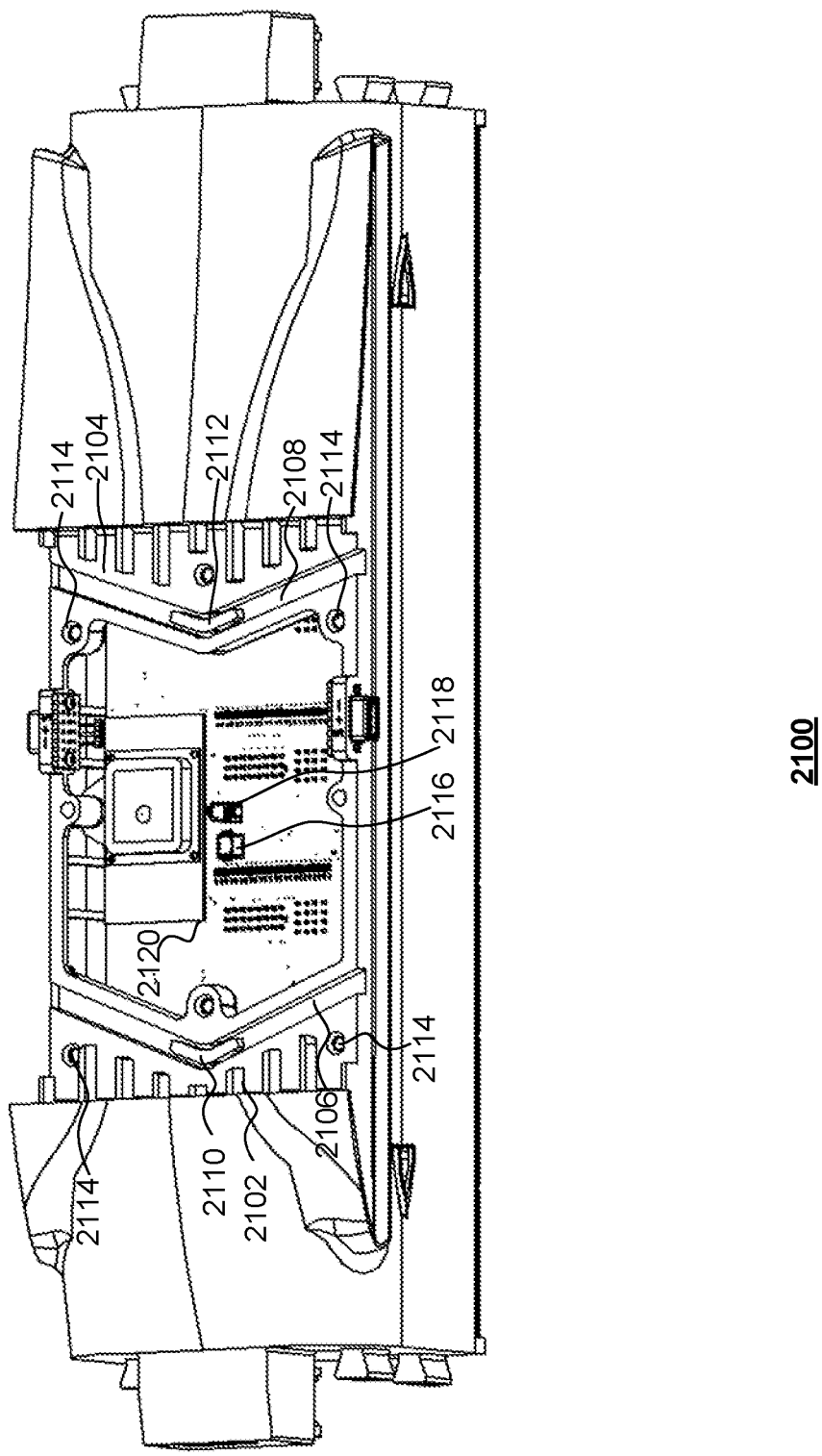
FIG. 21 depicts a wing anchor according to embodiments.

FIG. 21 illustrates a view 2100 of a pair of wing anchors 2102, 2104 according to embodiments. The wing anchors 2102, 2104 comprise a pair of channels 2106, 2108. The channels 2106, 2108 are angled according to a desired orientation of the wing relative to the fuselage 102, that is, according to a desired sweep angle. The channels 2106, 2108 comprise respective centrally disposed anchors 2110, 2112. The centrally disposed anchors 2110, 2112 are shaped to couple with complementary engagements (not shown) on the ends of the structural spars such as spars 1258, 1260, so that they remain in-situ when assembling the UV 100.

The wing anchors 2102, 2104 form part of a wing box that has a number of screw holes 2114 for securing a wing box cover plate 1122 in position. Alternatively, rather than the UV 100 bearing such a wing box cover plate 1122, it can bear a further module or component (not shown). Therefore, one or more than one interface is provided to interact with any such further module or component. In the example shown, a pair 2116, 2118 of such interfaces is provided. Furthermore, it can be seen that the upper surface of the UV 100 bears a GPS system 2120. At least one of the fuselage 102 and component housings are made from electromagnetically transparent material. The fuselage 102 and component housing can be manufactured using 3D printing.

Figure 22:
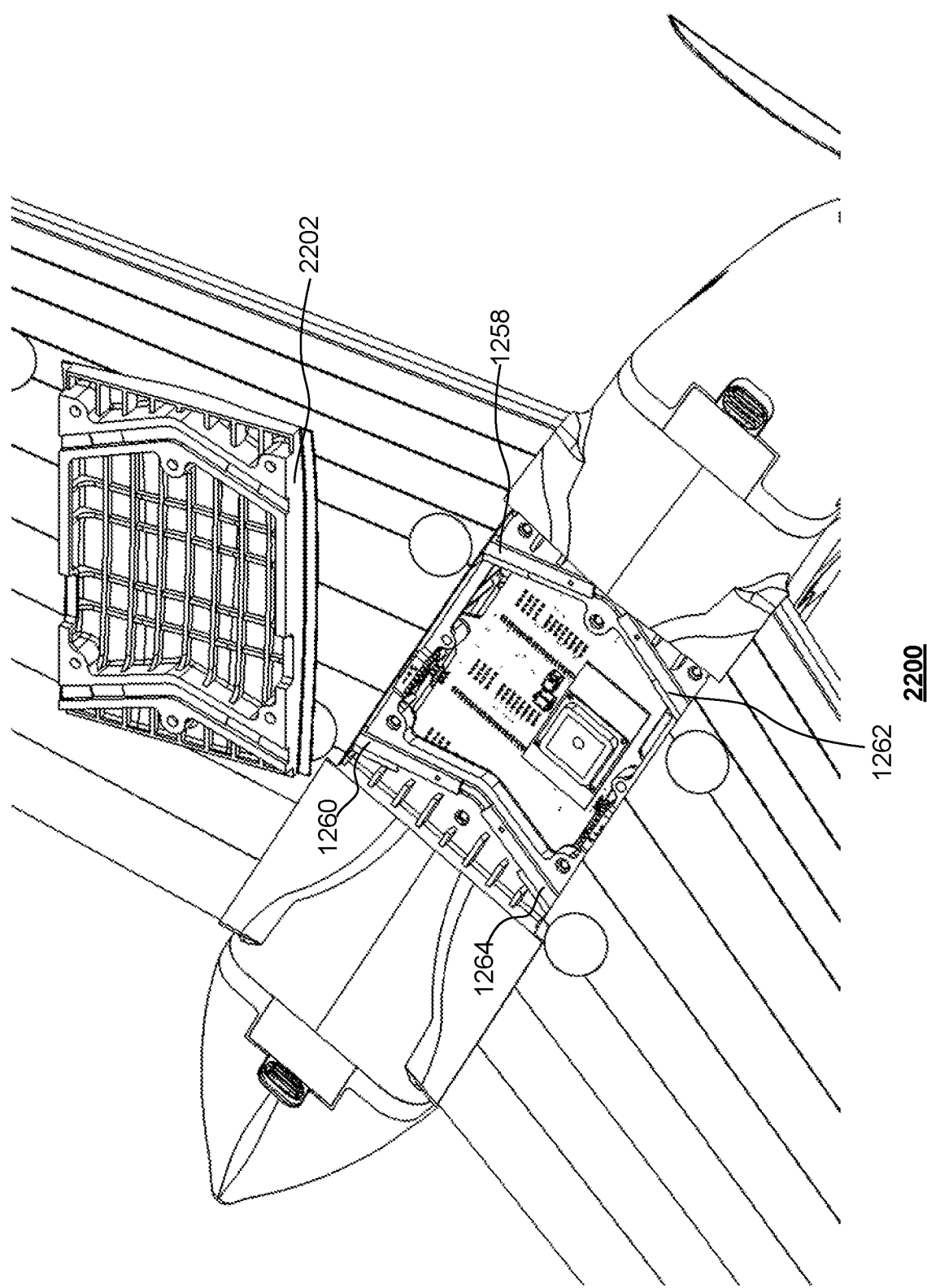
FIG. 22 illustrates a populated wing anchor according to embodiments.

FIG. 22 illustrates a view 2200 of populated wing anchors 2102, 2104 according to embodiments. Like reference numerals relate to like features. The structural spars 1258 and 1260 are contained within the channels 2106, 2108. Also shown is the wing anchor cover plate 2202.

Figure 23:
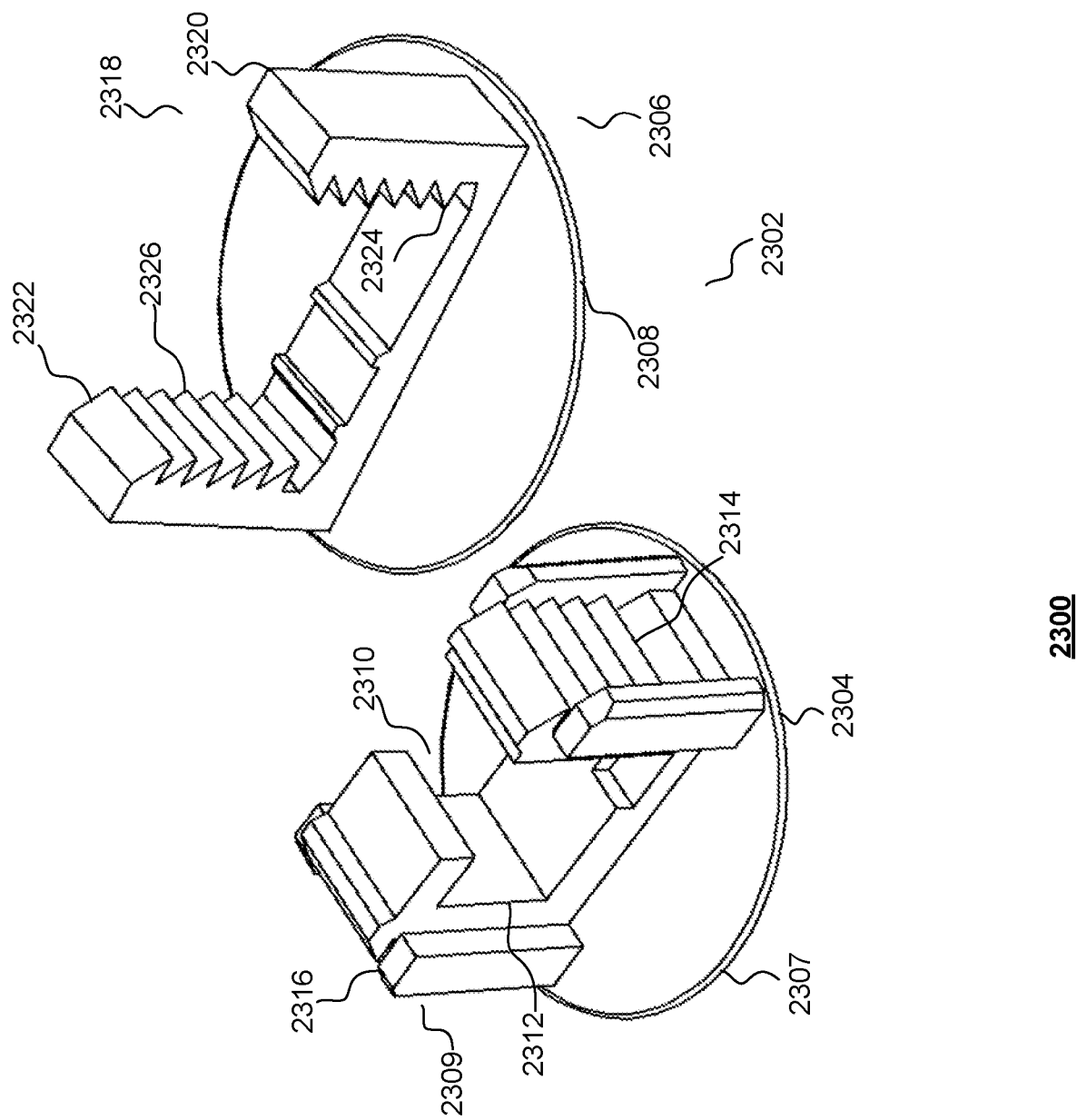
FIG. 23 shows a fastener according to embodiments.

FIG. 23 shows a view 2300 of a fastener 2302 used in assembling the UV 100, in particular, for assembling the wings 110, 112. The fastener 2302 comprises first 2304 and second 2306 parts. At least one of the first 2302 and second 2304 parts has a wing surface engaging or load bearing portion. In the example illustrated, both the first 2302 and second 2304 parts have such engaging or load bearing flanges 2307 and 2308. In the example shown, the flanges 2307 and 2308 are circular, but could equally well be some other shape.

The first part 2302 has, depending from the engaging or load bearing portion 2307, an up-right couple 2309 bearing a mouth 2310. The mouth 2310 is an example of the above described mouths 1306, 1308. Within the mouth 2310 is a recess or jaw 2312. The recess or jaw 2312 is an example of the above described recesses 1310, 1312. The recess or jaw 2312 is arranged to retain a respective structural spar such as one of the above described structural spars. The up-right couple 2309 has profiled sides 2314, 2316 with formations for co-operating with complementary formations of the second 2306 part. In the example shown, the profiled sides 2314, 2316 are realised using teeth.

The second part 2306 also has an up-right couple 2318 depending from the wing engaging or load bearing portion 2308. The up-right couple 2318 has two projections 2320, 2322 with profiled sides 2324, 2326 with formations for co-operating with complementary formations of the first part 2304. In the example shown, the profiled sides 2324, 2326 are realised using teeth.

The second part 2306 can also have features for restricting movement of at least one corresponding spar such as, for example, the locating spar, the structural spar or both the locating and structural spars.

Additionally, examples can be realised in which at least one or both of the up-right couples bears formations to maintain the couples in registration with one another. In the example depicted, the up-right couple 2309 has formations 2317 to retain the first and second parts 2304, 2306 in registration with one another, which can assist in ensuring that the fastener remains coupled and does not decouple, especially when under load. In the example shown, the formations 2317 form a recess for receiving the corresponding portions of the up-right couple 2318. The dependent portions of the up-right couples 2309, 2318 can alternative be called legs.

Figure 24:
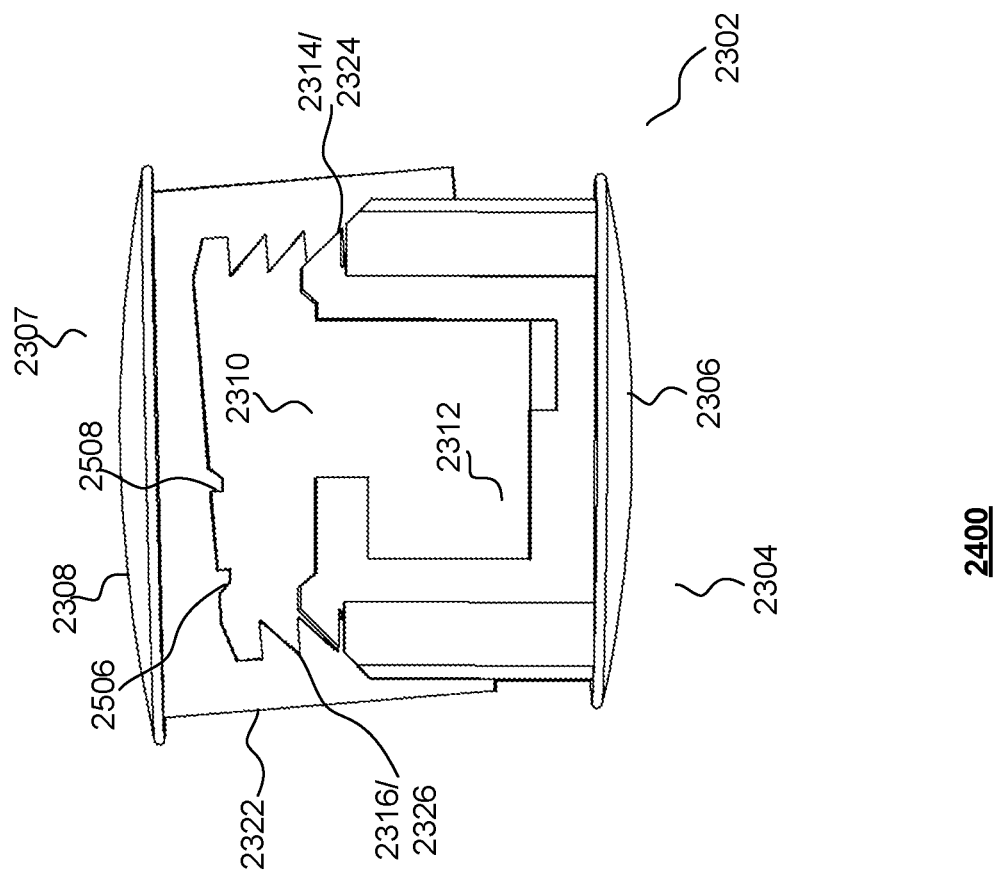
FIG. 24 shows a coupled view of the fastener according to embodiments.

FIG. 24 illustrates a view 2400 of the first 2304 and second 2306 parts in a coupled state. References numerals common to FIGS. 23 and 24 refer to the same element.

Figure 25:
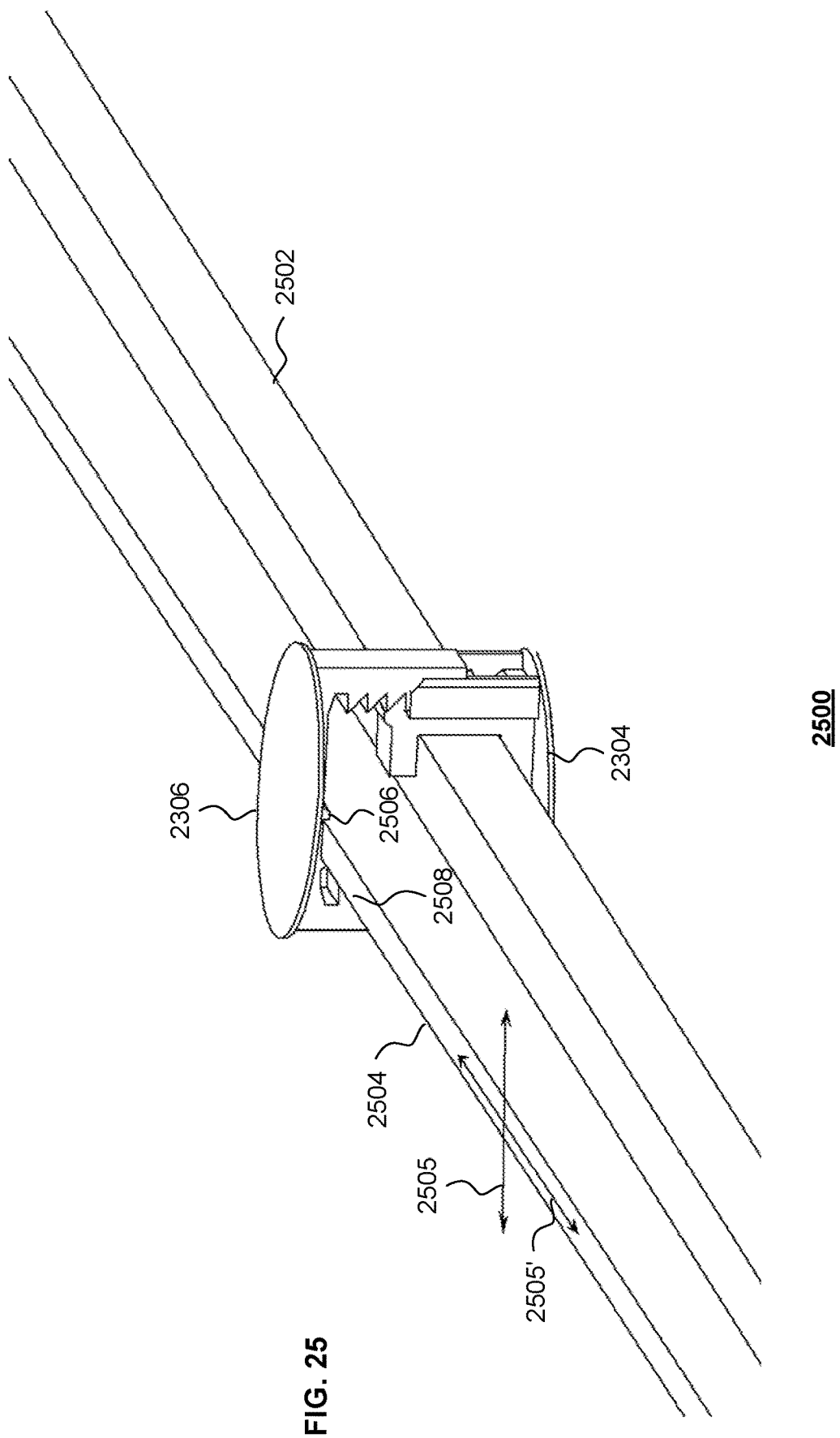
FIG. 25 shows an in-situ view of the fastener according to embodiments.

FIG. 25 depicts a view 2500 of the first 2304 and second 2306 parts retaining a structural spar 2502 and a corresponding locating spar 2504. The structural spar 2502 is an example of the above described structural spars. The locating spar 2504 is an example of the above described locating spars.

It can be appreciated that the structural spar 2502 is retained in-situ, at least in part, by the locating spar 2504. Furthermore, at least one of transverse 2505 or longitudinal 2505' movement of at least one corresponding spar can be influenced or otherwise restricted by corresponding features of at least one of the first 2304 and second 2306 parts. In the example shown, a pair of protrusions 2506 and 2508 are arranged to cooperate with the locating spar 2504 to influence or otherwise restrict transverse movement 2505 of the locating spar 2504 relative to the fastener.

The dependent up-right couples are arrange to form a snug fit with corresponding apertures such as, for example, the apertures in the wings.

Figure 26:
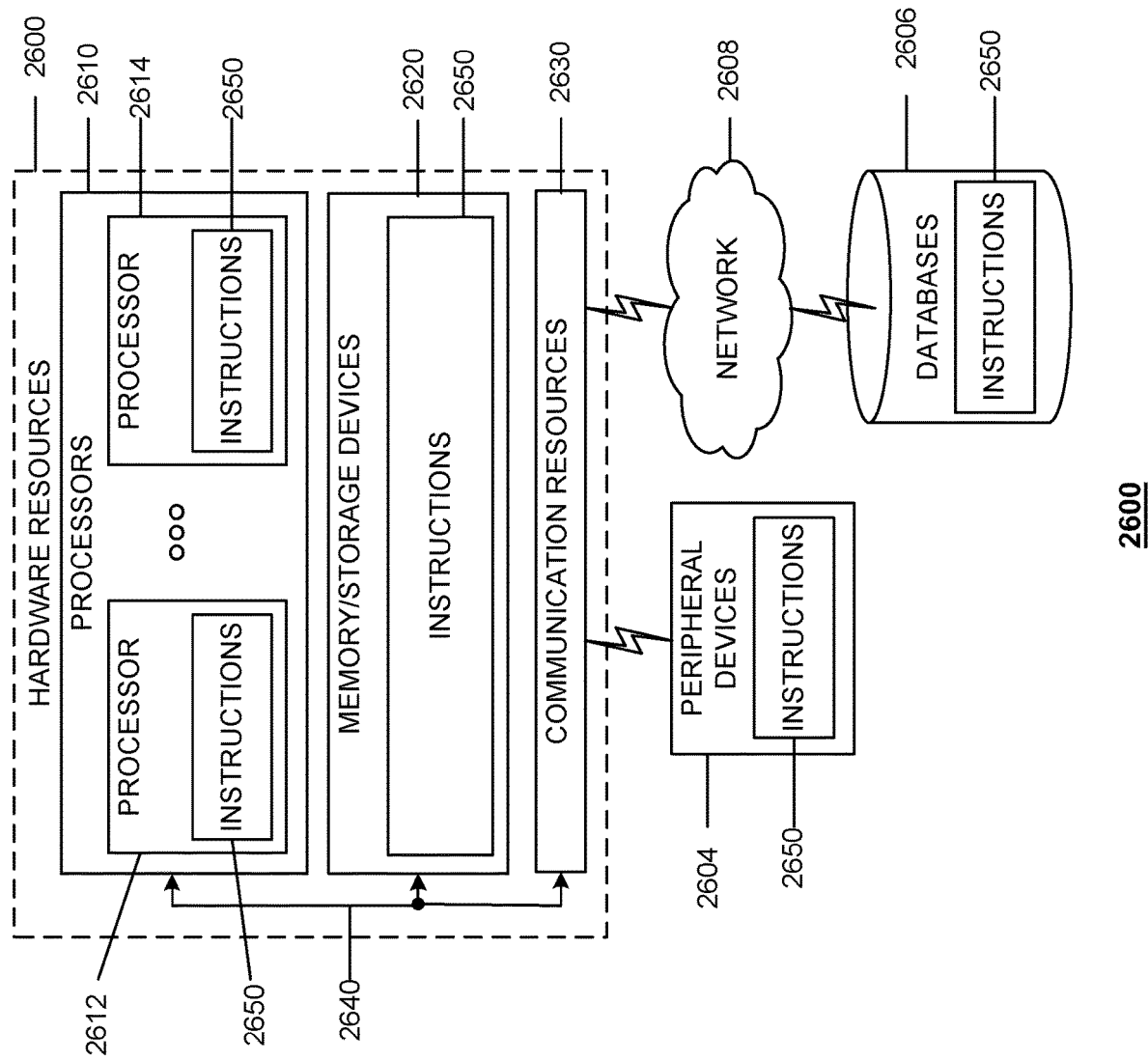
FIG. 26 shows machine readable instructions and storage according to embodiments.

FIG. 26 is a block diagram illustrating components, according to some example embodiments, able to read instructions from a machine-readable or computer-readable medium (e.g., a machine-readable storage medium) and perform any one or more of the methodologies discussed herein. Specifically, FIG. 26 shows a diagrammatic representation of hardware resources 2600 including one or more processors (or processor cores) 2610, one or more memory/storage devices 2620, and one or more communication resources 2630, each of which are communicatively coupled via a bus 2640.

The processors 2610 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 2612 and a processor 2614. The memory/storage devices 2620 may include main memory, disk storage, or any suitable combination thereof.

The communication resources 2630 may include interconnection and/or network interface components or other suitable devices to communicate with one or more peripheral devices 2604 and/or one or more databases 2606 via a network 2608. For example, the communication resources 2630 may include wired communication components (e.g., for coupling via a Universal Serial Bus (USB)), cellular communication components, Near Field Communication (NFC) components, Bluetooth® components (e.g., Bluetooth® Low Energy), Wi-Fi® components, and other communication components.

Instructions 2650 may comprise software, a program, an application, an applet, an app, or other executable code for causing at least any of the processors 2610 to perform any one or more of the methodologies discussed herein. The instructions 2650 may reside, completely or partially, within at least one of the processors 2610 (e.g., within the processor's cache memory), the memory/storage devices 2620, or any suitable combination thereof. Furthermore, any portion of the instructions 2650 may be transferred to the hardware resources 2600 from any combination of the peripheral devices 2604 and/or the databases 2606. Accordingly, the memory of processors 2610, the memory/storage devices 2620, the peripheral devices 2604, and the databases 2606 are examples of computer-readable and machine-readable media. The instructions can be arranged to implement any or all of the above-described application layer software.

It will be appreciated that embodiments can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or machine readable storage such as, for example, DVD, memory stick, chip, electronic device or solid state medium. It will be appreciated that the storage devices and storage media are embodiments of machine-readable storage, for example, non-transitory machine-readable storage, that are suitable for storing a program or programs comprising instructions that, when executed, implement embodiments described and claimed herein. Accordingly, embodiments provide machine executable code for implementing a system, apparatus, component, application layer software or any other software, device or method as described herein or as claimed herein and machine readable storage storing such a program or programs. Still further, such programs may be conveyed electronically via any medium such as a communication signal carried over a wired or wireless connection and embodiments suitably encompass the same.

It will be appreciated that embodiments allow a UV 100 to be constructed and deployed using only dry manufacturing techniques, that is, glue is not required, which greatly assists in limited or constrained environments such as when on board a ship or other vessel or when in theatre.

Figure 27:
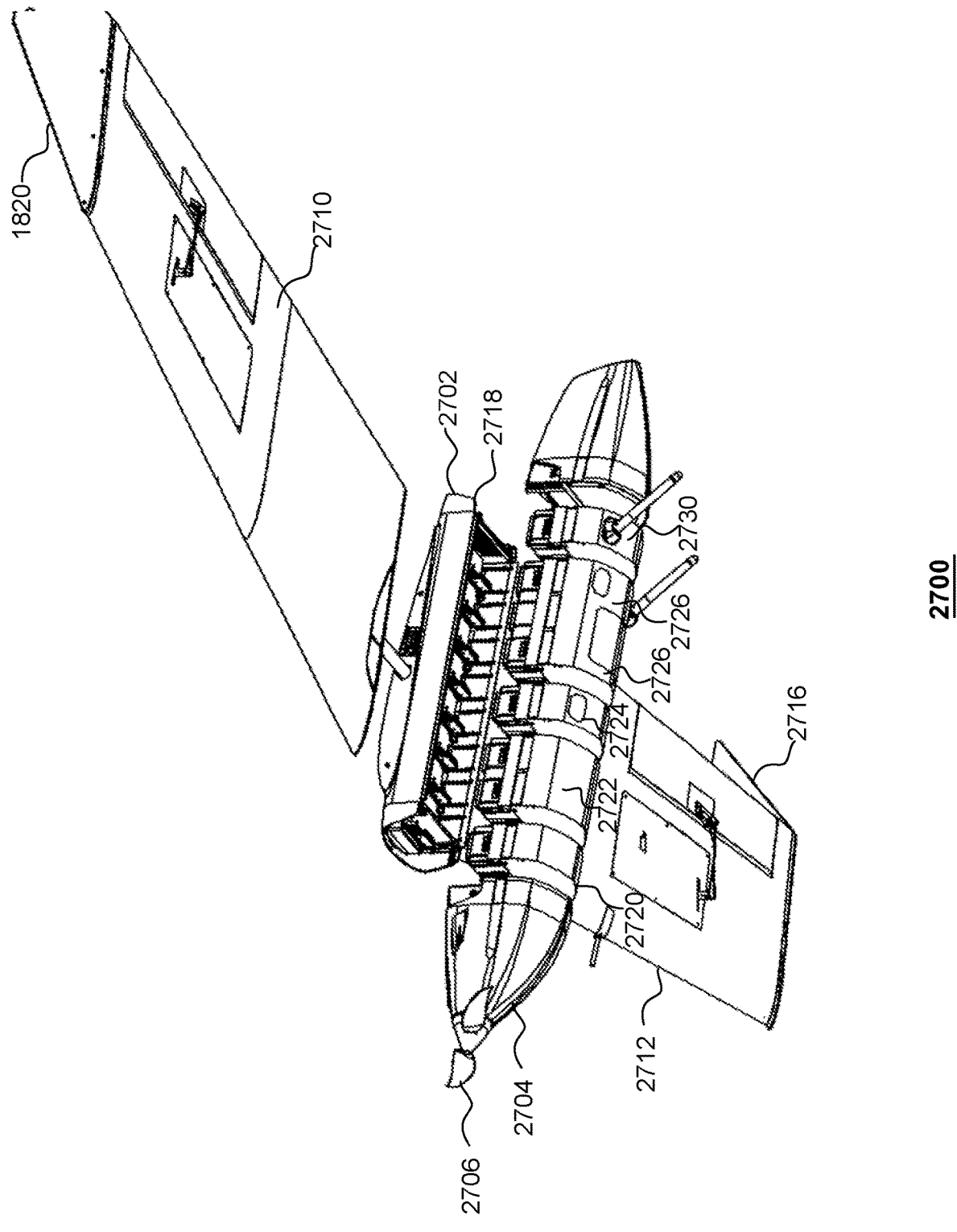
FIG. 27 depicts an exploded view a UV according to embodiments.

Referring to FIG. 27 there is shown an unmanned vehicle (UV) 2700 according to embodiments. The UV 2700 comprises a fuselage 2702. The fuselage 2702 can comprise a front portion 2704. In the embodiment shown, the front portion can be a propulsion unit. The propulsion unit comprises a motor (not shown) that drives a propeller 2706. The fuselage 2702 can comprise a tail portion 2708. The UV 2700 additionally comprises a pair of wings 2710 and 2712. The wings 2710 and 2712 depicted comprise winglets 2714 and 2716. The fuselage comprises a bay 2718. The bay 2718 of the fuselage 2702 is shown as having a set of installed components 2720 to 2730. The set of installed components 2720 to 2730 can be selected from a plurality of possible components for installation in the bay 2718. The plurality of possible components for installation in the bay 2718 can comprise, for example, one or more than one of the flight controller 132, the payload 134, the communications module 136, a propulsion module such as, for example, the propulsion module 104 depicted, a rotor module 138, a tail portion such as, for example, the tail portion 108 depicted, a mission module 140 and a battery component 142, taken jointly and severally in any and all permutations. It can be appreciated that the plurality of possible components for installation in the bay 2718 is greater than the number of components that can be accommodated by the bay 2718. As described above with reference to various embodiments, communication between the components can be realised using the one or more than one of the busses of other embodiments such as, for example, the CANbus or Ethernet, taken jointly and severally. The UV 2700 can comprise any one or more of any features of the other embodiments described herein taken jointly and severally in any and all permutations.

Figure 28:
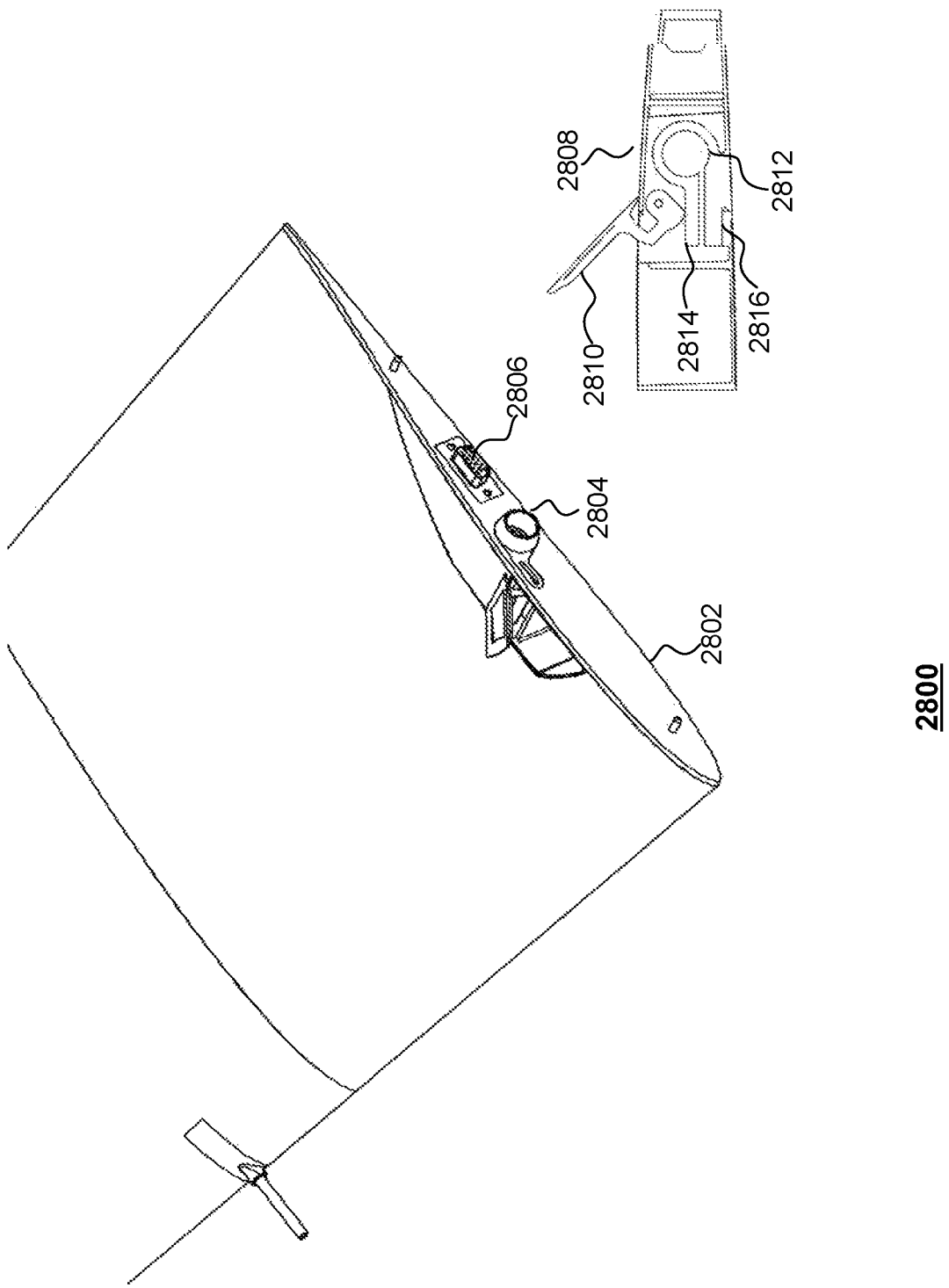
FIG. 28 illustrates a further fuselage facing wing coupling according to embodiments.

FIG. 28 illustrates a view 2800 of an assembled wing such as, for example, wing 2710 or 2712 according to embodiments. Reference numerals common to other drawings refer to the same element. It can be appreciated that rather than having multiple structural spars project 1258, 1260 from the fuselage facing end 2802 of the wing, a structural spar aperture 2804 is provided through which a structural spar (not shown) can project to engagement with the fuselage 2702. Furthermore, a power coupling 2806 is provided that is connected to a corresponding servo for connection to the bus architecture so that the ailerons can be controlled.

Also shown in the insert to FIG. 28 is a wing clamp 2808 for releasably retaining the structural spar of the wing. The wing clamp 2808 comprises an actuator 2810 for actuating a resiliently deformable aperture 2812. The aperture 2812 is arranged to releasably retain the structural spar of the wing. The aperture 2812 dimensions are controlled using the actuator 2810, which operates on a first arm 2814 of a pair of arms 2814, 2816, to urge the arms together in a fastened state, thereby reducing the diameter of the aperture 2812 to retain the structural spar. Conversely, when the actuator 2810 is raised, the arms 2814, 2816 are biased towards the open or separated position depicted, thereby releasing the structural spar.

Figure 29:
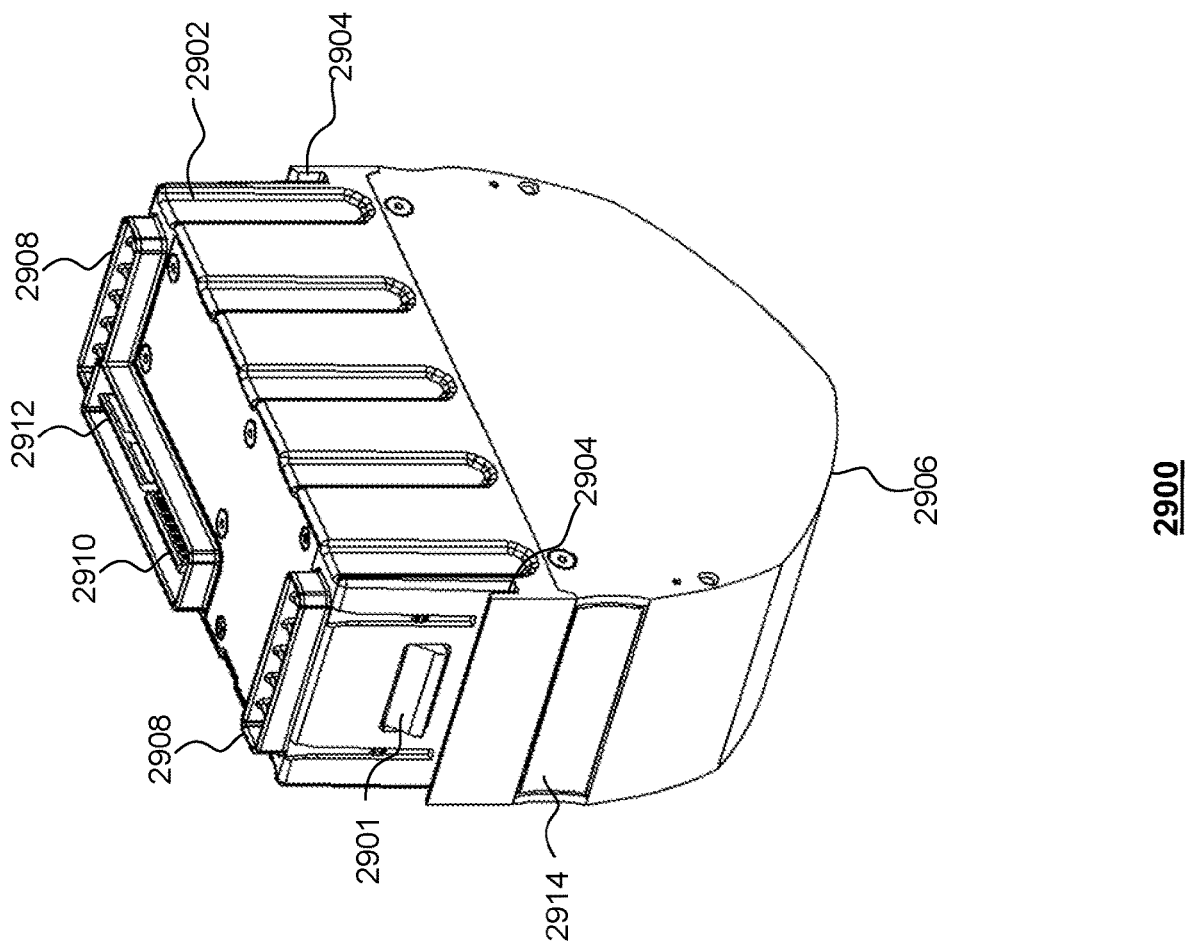
FIG. 29 shows a component according to embodiments.
Figure 30:
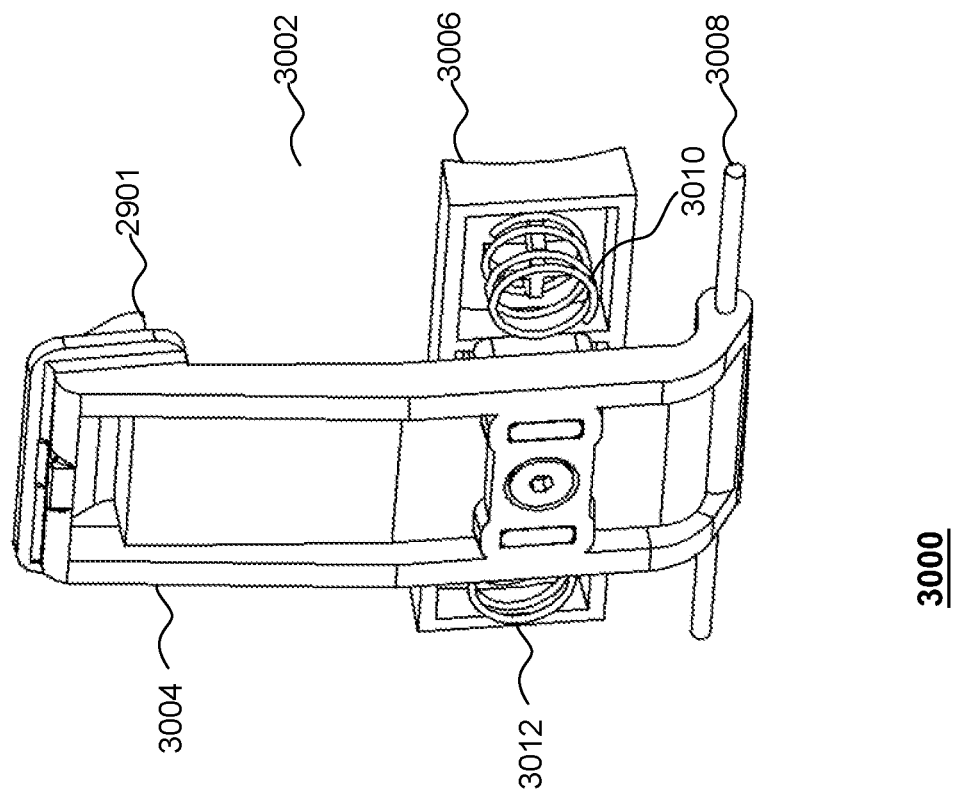
FIG. 30 illustrates a coupling for a component according to embodiments.
Figure 31:
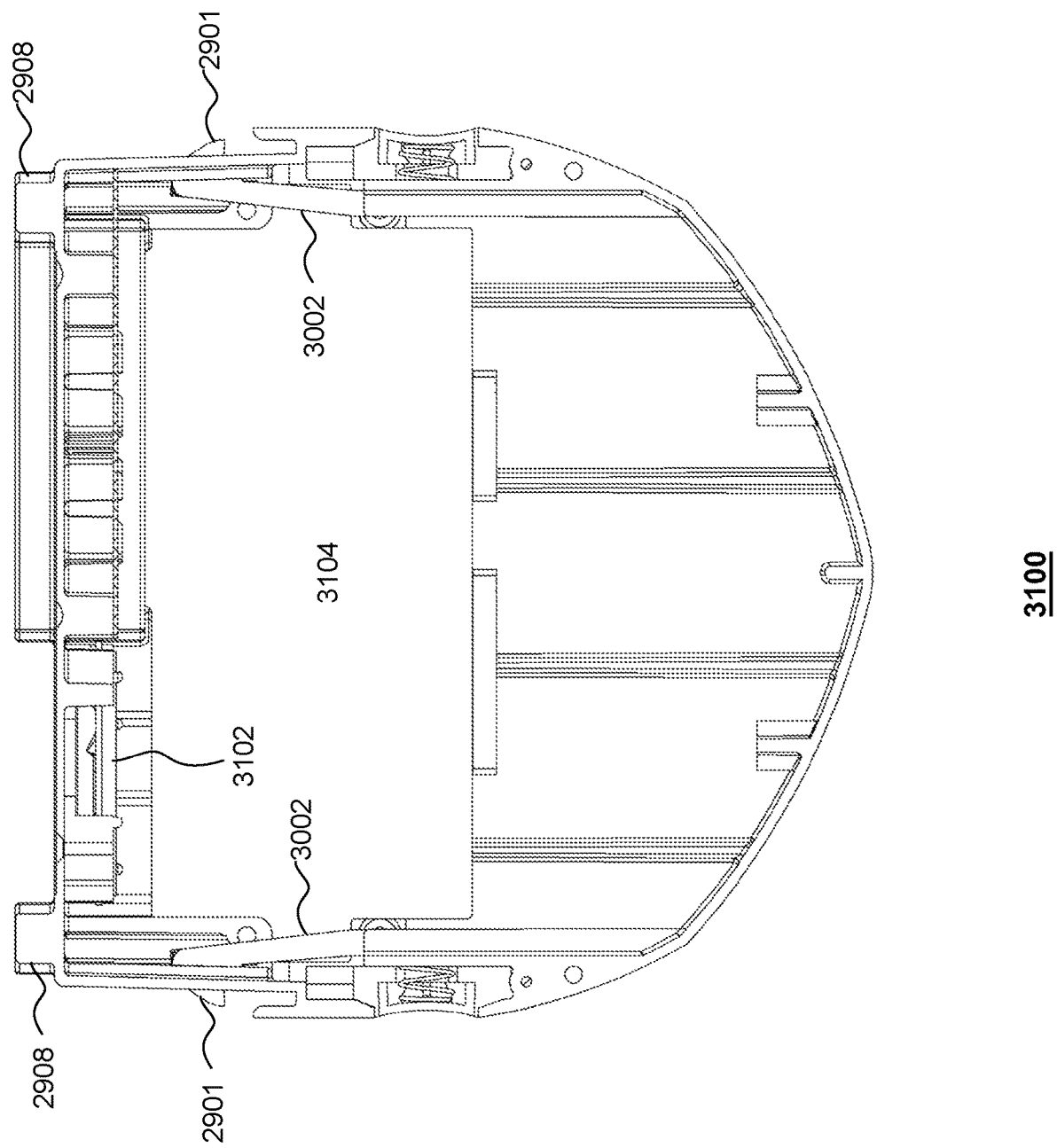
FIG. 31 depicts an interior view of the component of FIG. 29 according to embodiments.

FIGS. 29 to 31 depict views 2900, 3000, 3100 of a component or module housing 2902 according to embodiments. Lips 2901, similar to lips 1104, of the component 2902 are intended to engage with corresponding complementary formations or recesses (not shown but similar to recesses 1106) of the fuselage 2702. It will be recalled that the lip 1104 is carried by a resiliently deformable member 1806 that can be flexed to allow insertion and removal of a respective component into and from the bay 118 of the fuselage 102. However, lip 2901 is carried by, or forms part of a mechanism described below with reference to FIGS. 30 and 31.

The underside 2906 of the housing 3102 is profiled to present a more resilient surface to protect against impact damage that might be sustained during landing. One or more than one vent 2908 can be provided for cooling. The one or more than one vent 2908 can be associated with a cooling fan (shown in FIG. 31).

The housing 2902 is shown as having a PCB interface 2910 and associated aperture 2912 for coupling to a respective bus. As discussed above, the PCB 2910 is used connect the PCB electronics to the bus architecture. Furthermore, as described above, the PCB 2910 can comprise one or more than one voltage regulator. Additionally, or alternatively, like the above-described PCB, the PCB 2910 can comprise one or more than one interface electrically coupled to the connector for coupling to the bus architecture. The connector also has two power pins for supplying power to the PCB and any adaptor PCB. The component 2902 also bears an actuator aperture 2914 for receiving an actuator of the mechanism 3002 described below.

Referring to FIG. 30, there is shown a view 3000 of a mechanism 3002 for coupling the component 2902 to the fuselage 2702. The mechanism 3002 comprises the lip 2901 that engages a complementary formation or recess on the fuselage 2902 like the above-described recess 1106. The mechanism comprises an arm 3004 that carries the lip 2901 at one end. The arm 3004 is moveable via an actuator 3006. The actuator 3006 is arranged to be exposed to the exterior of the component 2902 via the corresponding aperture 2914. The arm 3004 can be arranged to pivot about an axis of a rod 3008. The rod can be disposed at the other end of the arm 29 that is distal to the end bearing the lip 2901. The actuator 3006 can be arranged to be biased towards a fastened position in which the lip 2901 protrudes from the component 2902 to engage a corresponding recess of the fuselage. The biasing can be provided by one or more than one spring; such as the two springs 3010, 3012 shown. Actuating the actuator 3006 causes the lip 2901 to disengage from the corresponding recess of the fuselage 2702 to allow the component 2902 to be removed from the fuselage.

FIG. 31 shows a view 3100 of the interior of the component 2902. It can be appreciated that a fan 3102 is provided adjacent to the vent 2908. The fan 3102 is arranged to cool the electronics within the component 2902. Also visible is the PCB 3104 and a pair of mechanisms.

Although the examples described above refer to a bus architecture, embodiments are not limited thereto. Embodiments can equally well be realised in which multiple buses are used. For example, a first bus architecture can be used to support communications between a first category of components while a second bus architecture can be used to support communications between a second category of components. An example, can be realised in which flight critical components communicate using the CANbus, whereas non-flight critical components communicate using, for example, an Ethernet.

The invention claimed is:

1. A kit for constructing a reconfigurable unmanned vehicle, the kit comprising:
   a plurality of components relating to respective entities for flight control and operation of the reconfigurable unmanned vehicle; and
   a fuselage presenting a bay for receiving selected components of the plurality of components;
   the selected components comprising a propulsion and rotor module, and a tail module;
said propulsion and rotor module and said tail module being mountable on and demountable from the fuselage
   a foldable wing comprising:
      a substantially planar plastic having:
         a plurality of scores to facilitate folding portions of the wing during construction, wherein the plurality of scores comprise a leading edge score arranged to define the leading edge of the wing in an assembled state, wherein the leading edge score separates anterior/suction and inferior/pressure aerofoil surfaces, and
         a plurality of holes for receiving respective clips, at least some of the clips being arranged to retain at least one respective spar for influencing rigidity of the wing, wherein the plurality of holes comprises a set of holes disposed in the anterior/suction and interior/pressure aerofoil surfaces for receiving respective fasteners, the fasteners being arranged to retain the foldable wing in an assembled state.

2. The kit of claim 1, wherein the plurality of scores comprise an aileron edge score arranged to separate at least one aileron control surface from at least one of the anterior/suction and inferior/pressure aerofoil surfaces.

3. The kit of claim 1, wherein the plurality of scores comprise a winglet edge score arranged to define at least one winglet control surface relative to at least one of the anterior/suction and inferior/pressure aerofoil surfaces.

4. The kit of claim 1, wherein the substantially planar plastic comprises a trailing edge to define a trailing edge of the wing.

5. The kit of claim 1, wherein the respective fasteners comprise a set of fasteners arranged to retain the at least one respective spar.

6. The kit of claim 5, wherein the set of fasteners arranged to retain the at least one respective spar comprises a jaw to retain the at least one respective spar.

7. The kit of claim 6, wherein the at least one spar comprises a first spar and a second spar, the first and second spar being capable of being co-operatively arranged such that the second spar assists in retaining the first spar within the jaw.

8. The kit of claim 1, wherein the at least one respective spar can be coupled to a fuselage.

9. The kit of claim 1, wherein the foldable wing further comprises a further plurality of holes for receiving an actuator arm associated with an aileron actuator.

\* \* \* \* \*